(12) United States Patent
Broje

(10) Patent No.: US 7,410,577 B2
(45) Date of Patent: Aug. 12, 2008

(54) METHOD AND APPARATUS FOR RECOVERY OF SPILLED OIL OR OTHER VISCOUS FLUID

(75) Inventor: Victoria Broje, Santa Barbara, CA (US)

(73) Assignee: The Regents of the University of California, Oakland, CA (US)

(*) Notice: Subject to any disclaimer, the term of this patent is extended or adjusted under 35 U.S.C. 154(b) by 39 days.

(21) Appl. No.: 11/406,829

(22) Filed: Apr. 18, 2006

(65) Prior Publication Data

US 2006/0266694 A1    Nov. 30, 2006

Related U.S. Application Data

(60) Provisional application No. 60/673,043, filed on Apr. 19, 2005.

(51) Int. Cl.
*E02B 15/04* (2006.01)
(52) U.S. Cl. ............... 210/242.3; 210/523; 210/540; 210/923
(58) Field of Classification Search ........... 210/242.3, 210/242.4, 923, 924, 523, 540
See application file for complete search history.

(56) References Cited

U.S. PATENT DOCUMENTS

| | | | |
|---|---|---|---|
| 3,338,414 A | | 8/1967 | Lefke et al. |
| 3,358,838 A | * | 12/1967 | Kosar et al. ............. 210/242.3 |
| 3,426,902 A | * | 2/1969 | Bauer et al. ............... 210/923 |
| 3,612,277 A | | 10/1971 | Van Stavern et al. |
| 3,670,896 A | * | 6/1972 | Hale et al. .............. 210/242.3 |
| 3,685,653 A | | 8/1972 | Van Stavern et al. |
| 3,700,107 A | * | 10/1972 | Flaviani ................. 210/242.3 |
| 3,865,730 A | | 2/1975 | Ayers et al. |
| 3,905,902 A | * | 9/1975 | Hoegberg et al. ....... 210/242.3 |
| 4,013,561 A | | 3/1977 | Murphy |
| 4,264,450 A | | 4/1981 | Ayers et al. |
| 4,315,818 A | | 2/1982 | Thomas |
| 4,549,970 A | | 10/1985 | Ek et al. |
| 4,555,338 A | | 11/1985 | Marchionda |

(Continued)

OTHER PUBLICATIONS

Broje, V.A.; Keller, A. "Tailored polymeric meterials to increase oil spill recovery in marine environments," A report for the U.S. Department of the Interior Mineral Management Service, MMS Contract No. 1435-04-04-CT-36287, (2005).

(Continued)

*Primary Examiner*—Christopher Upton
(74) *Attorney, Agent, or Firm*—John P. O'Banion

(57) ABSTRACT

A method, apparatus and system for increasing the recovery efficiency of spilled oil or any other viscous fluid. The surface of a rotatable oleophilic fluid recovery unit in an adhesion (oelophilic) skimmer or other recovery apparatus is patterned with a plurality of grooves configured for formation of menisci and pooling of fluid in the grooves when the surface contacts a viscous fluid. When the surface of the fluid recovery unit rotates out of (e.g., is withdrawn from) the body of viscous fluid, an amount of the viscous fluid adheres to the patterned surface. A scraper is provided having a surface geometry that matches the surface geometry of the fluid recovery unit and allows the viscous fluid to be scraped off the surface of the fluid recovery unit and transferred to a collector. Accordingly, both fluid separation and fluid recovery are made possible.

27 Claims, 21 Drawing Sheets

U.S. PATENT DOCUMENTS

| | | | |
|---|---|---|---|
| 4,575,426 A | | 3/1986 | Littlejohn et al. |
| 4,642,185 A | * | 2/1987 | Turner et al. ............. 210/242.3 |
| 4,744,889 A | | 5/1988 | Kruyer |
| 4,876,011 A | | 10/1989 | Betts et al. |
| 5,015,378 A | | 5/1991 | Lewan et al. |
| 5,043,064 A | | 8/1991 | Abell et al. |
| 5,062,953 A | | 11/1991 | Lewan |
| 5,143,629 A | | 9/1992 | Lint |
| 5,200,083 A | | 4/1993 | Kaylor |
| 5,316,672 A | | 5/1994 | Wilson et al. |
| 5,609,755 A | * | 3/1997 | Vilandre .................. 210/242.3 |
| 5,902,664 A | | 5/1999 | Gurfinkel |
| 5,954,973 A | | 9/1999 | Hobson |
| 5,961,825 A | | 10/1999 | Love |

OTHER PUBLICATIONS

Broje, V.A.; Keller, A. "Optimization of oleophilic skimmer recovery surface: field testing at Ohmsett facility," A report for the U.S. Department of the Interior Mineral Management Service, MMS Contract No. 1435-01-04-RP-36248 (2006).

Broje, V.A.; Keller, A. "Improved recovery of oil spills from water surfaces using tailored surfaces in oleophilic skimmers" Proceedings of the Freshwater Spills Symposium (2006).

Hewson, R.W. et al. "A theoretical and experimental investigation of tri-helical gravure roll coating," Chem. Eng. Sci., vol. 61, pp. 5487-5499 (2006).

* cited by examiner

A - A

METHOD AND APPARATUS FOR RECOVERY OF SPILLED OIL OR OTHER VISCOUS FLUID

CROSS-REFERENCE TO RELATED APPLICATIONS

This application claims priority to U.S. provisional application Ser. No. 60/673,043, filed on Apr. 19, 2005, incorporated herein by reference in its entirety.

STATEMENT REGARDING FEDERALLY SPONSORED RESEARCH OR DEVELOPMENT

This invention was made with Government support under Contract Nos. 1435-01-04-RP-36248 and 1435-01-04-CT-36287, awarded by the U.S. Minerals Management Service (US MMS). The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to separating fluids, and more particularly to separating and recovering viscous fluids from water or other fluids.

2. Description of Related Art

Mechanical recovery is the most commonly used oil spill response technique, and is a technique that is used in industrial applications as well. This technique physically removes oil from the water surface, and the oil is usually floating on the water surface. Unlike other cleanup techniques, mechanical recovery can be efficiently applied to treat emulsified oils as well as oils of variable viscosities. The main weakness of mechanical cleanup is the recovery rate. Mechanical recovery may be very time consuming and expensive when employed on a large scale. Mechanical recovery may also require a large number of personnel and equipment, and every additional hour of cleanup time can significantly increase the cost of recovery. Therefore, a more efficient recovery device could reduce cleanup costs significantly, as well as reduce the risk of oil reaching the shoreline.

An adhesion (oleophilic) skimmer is one of the most common types of mechanical recovery equipment. This type of skimmer is based on the adhesion of oil to a rotating skimmer surface. The rotating surface lifts the oil out of the water to an oil removal device (e.g., scraper, roller, etc.). The adhesion surface is the most critical element of the skimmer as it determines the efficiency of recovery. Various shapes of the skimmer, such as a mop, belt, brush, disc, and drum, have been developed to increase skimmer efficiency.

Two types of recovery surfaces patterns are usually used for adhesion oil skimmers. Smooth flat surfaces are used on drum, disk and belt skimmers. Drum and belt skimmers might also have a surface covered with brushes. The latter configuration has an obvious advantage due to the much higher surface area (oil covering every bristle) and formation of oil meniscuses between the bristles, but the difficulty of oil removal from the brushes may result in a lower overall recovery. Brush surfaces tend to pick up debris and water together with oil, which may affect the recovery efficiency and oil transfer process. The smooth surface area of a drum, disk and belt doesn't usually recover debris, but this configuration picks up less oil than a brush surface due to the smaller surface area.

The oil spill recovery process has two equally important goals. The first one is to remove oil from the water surface and the second one is to remove oil adhered to the recovery surface and transfer it into the collector. The recovery efficiency depends on the achievement of both of these goals. In the case of a smooth surface, the amount of recovered oil is relatively low, but close to 100% of it can be removed by a scraper. In the case of a brush surface and light to medium oils, oil covers every bristle and forms small menisci between the bristles, preventing oil from draining back into the slick. Unfortunately, the configuration of this surface doesn't allow for scraping every bristle individually and removing all adhered oil. Hence, a significant amount of oil remains on the surface after scraping and returns back to the oil slick, thereby reducing the overall recovery rate.

A brush configuration works much more efficiently on high viscosity and semi-solid oils. In this case, oil doesn't cover the bristles or penetrate inside the brush. It is merely being lifted from the water by the tips of the bristles and physically transported to the collector. This process is not exactly related to oil adhesion and spreading properties. This explains the ability of a brush surface to recover more debris than a smooth surface.

Accordingly, using brushes increases the contact surface area between oil and recovery device, and exploits the effect of capillary forces for collection of oil between the bristles. A disadvantage of the brush method, however, is the fact that brushes collect debris and water together with oil, which can clog the pipes in oil-collection device. Another disadvantage is its inability to remove large part of the oil adhered to brushes using scrapers, since they cannot scrape each brush individually. Improvement has been sought by using porous mats (or similar structures) covering the surface of the skimmer, allowing oil to penetrate into its matrix, be lifted from the water, and squeezed out by rollers into the collection device. However, such improvements are intended to increase the volume of oil that can be recovered from water per unit area of the recovery surface. Although such improvements allow a thicker oil film to be formed on the recovery surface, they do not allow for scraping out all of the recovered oil. In contrast, belts and drums with smooth surfaces allow almost 100% of adhered oil to be transferred into collector. The disadvantage of smooth recovery surfaces, however, is that only a relatively thin film can be formed on its surface and total volume of the recovered oil is relatively small.

To select the most efficient oil spill response action, it is important to understand the chemistry and physical behavior of spilled oil and the way these characteristics change over time. Viscosity increase and emulsion formation are dynamic processes of particular interest. Petroleum products and oils originated at different oil fields have extremely diverse properties and chemical compositions. Viscosity of these products can vary in the range of 0.5 mPas to 100,000 mPas. Oil weathering brings additional complication to the prediction of spilled oil properties and has significant ramifications with respect to appropriate recovery strategies. During the first twenty-four hours, some oils can lose from 5% to 50% of light compounds. A major increase in oil viscosity, caused by evaporation of lighter compounds and emulsification, will occur within hours to a few days. Therefore, the oil that has to be recovered does not have the same properties as the oil that has been spilled. Existing types of skimmers are not tailored to the properties of the product that has to be recovered and can only recover oil within a certain range of properties. They are characterized by a specific "window of opportunity"—a time period when this equipment may be used, which is largely determined by the oil properties (viscosity in particular). Outside of that time period, response measures with this equipment may become ineffective.

BRIEF SUMMARY OF THE INVENTION

The present invention pertains to separating viscous fluids from water or other fluids by, for example, increasing the recovery efficiency of an adhesion (oleophilic) skimmer. An aspect of the invention is to modify the surface of a rotatable fluid recovery unit in an adhesion skimmer with a pattern of grooves that increases the recovery efficiency.

The characteristics of an adhesion skimmer that can significantly increase oil recovery efficiency can be summarized as follows:

(a) It should maximize the collection surface area for a given width of the recovery surface (e.g., drum, belt, or disk).

(b) A configuration allowing the formation of oil menisci is desirable as it allows thicker layer of oil to be recovered and slows oil drainage back into the oil spill.

(c) Close to 100% of the oil adhered to the recovery surface should be able to be removed by the scraper.

(d) It should be able to adjust to the changes of oil properties as it weathers over the time and efficiently recover oil with wide range of properties. This would allow the same recovery surface to be used for the whole period of the recovery process.

The present invention addresses these characteristics by means of patterning the surface of the recovery unit with a plurality of grooves that are configured to allow formation of menisci and provide a space for oil to pool.

By way of example, and not of limitation, patterning the surface of the rotatable fluid recovery unit in a skimmer with narrow "V-shaped" grooves or channels will maximize the surface area of the fluid recovery unit. Depending on the angle and the depth of the grooves, the surface area can be increased several-fold for the same width of recovery surface. In addition, this configuration allows menisci to be formed in the depth of the groove, thereby increasing the amount of recovered oil and slowing down oil drainage. The variation of groove opening with groove depth allows it to be efficiently used on oils with a wide range of viscosities. The lighter oils will be collected in the depth of the grooves, while viscous oils can be collected in a wider part of the groove allowing water drainage in the deeper part of the groove. The scraper is then configured to match the contour of the recovery surface. When V-patterned surfaces with a matching scraper are used, close to 100% of adhered oil can be removed and transferred into the oil collector.

Note also that the angle of oil withdrawal from the oil spill has an effect on the formation and thickness of the adhered oil film. If oil is withdrawn at a sharp angle (0-90 degrees), it forms a thicker film on the surface because the effect of gravity is reduced by the presence of the recovery surface underneath the film. In this case, drainage of oil is relatively slow. If oil is withdrawn at the angle larger than 90-degrees, gravity force is not compensated by the substrate and the rate of oil drainage from the surface is significantly higher. This leads to formation of much thinner oil film and, hence, lower recovery efficiency. Although a V-patterned surface (or any recovery surface for that matter) is more efficient when used to withdraw oil at angles of less than 90-degrees to maximize the thickness of recovered film, a 90-degree withdrawal angle and higher can be used as well.

Furthermore, when oil is rotated below the surface of the water, the hydrostatic difference between the oil and water causes it to impact the recovery surface quite well. This very buoyant oil attaches securely to the recovery surface, thereby allowing the oil to be rotated out of the water faster than with other devices.

Accordingly, an aspect of the present invention is a way to increase the recovery efficiency of floating oil (or any other viscous fluid) by modifying the surface geometry of the fluid recovery unit in an oleophilic skimmer.

Another aspect of the present invention is a scraper having a surface geometry that is complementary to the grooved geometry of the recovery surface and allows oil to be scraped off the recovery surface and transferred to the collector.

Another aspect of the invention is that, when the fluid recovery unit (e.g., drum, disk, or belt) rotates into the viscous fluid, the grooves help to keep the viscous fluid at the surface of the fluid recovery unit. In other words, the viscous fluid does not escape from the grooves sideways when the fluid recovery unit pushes the fluid under water because it is being held by the sides of the groove. In the case of a smooth drum or belt, water underneath the layer of viscous fluid will push it upwards, so the viscous fluid may escape sideways from underneath the drum or belt and will not stay in contact with the recovery surface.

In one embodiment, an apparatus for recovery of a viscous fluid according to the invention comprises a rotatable fluid recovery unit having a recovery surface patterned with a plurality of grooves that are configured for collecting and retaining a viscous fluid which contacts the recovery surface, wherein menisci are formed and the viscous fluid pools in the grooves.

In one embodiment, the grooves have a depth of approximately five inches or less. More preferably, in one beneficial embodiment, the grooves have a depth of approximately one inch or less.

In one embodiment, the grooves are defined by walls having an angle of separation of approximately ninety degrees or less. In another embodiment, the angle of separation is approximately sixty degrees or less. In another embodiment, the angle of separation is approximately thirty degrees or less. In such embodiments, the angle of separation slows draining of viscous fluid from the grooves.

In one embodiment, the fluid recovery unit has first and second ends, a central longitudinal axis extending between the first and second ends, and a central radial axis that is orthogonal to the longitudinal axis, and the grooves are substantially aligned with the central radial axis. In another embodiment, the grooves are angularly offset from the central radial axis by an angle less than approximately ninety degrees.

In one embodiment, the apparatus further comprises a scraper having an edge geometry complementary to the grooves so the scraper is adapted for removal of viscous fluid collected by the fluid recovery unit.

Further aspects and embodiments of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
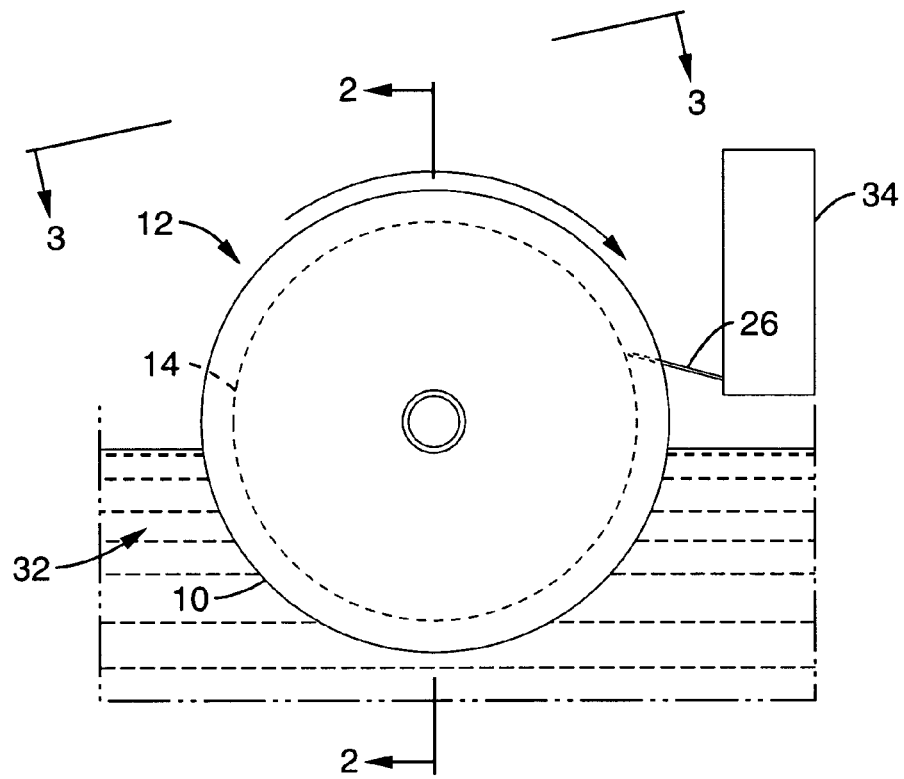
FIG. 1 is a schematic partial side view of a skimmer with an embodiment of a grooved drum-type fluid recovery unit according to the present invention.
Figure 2:
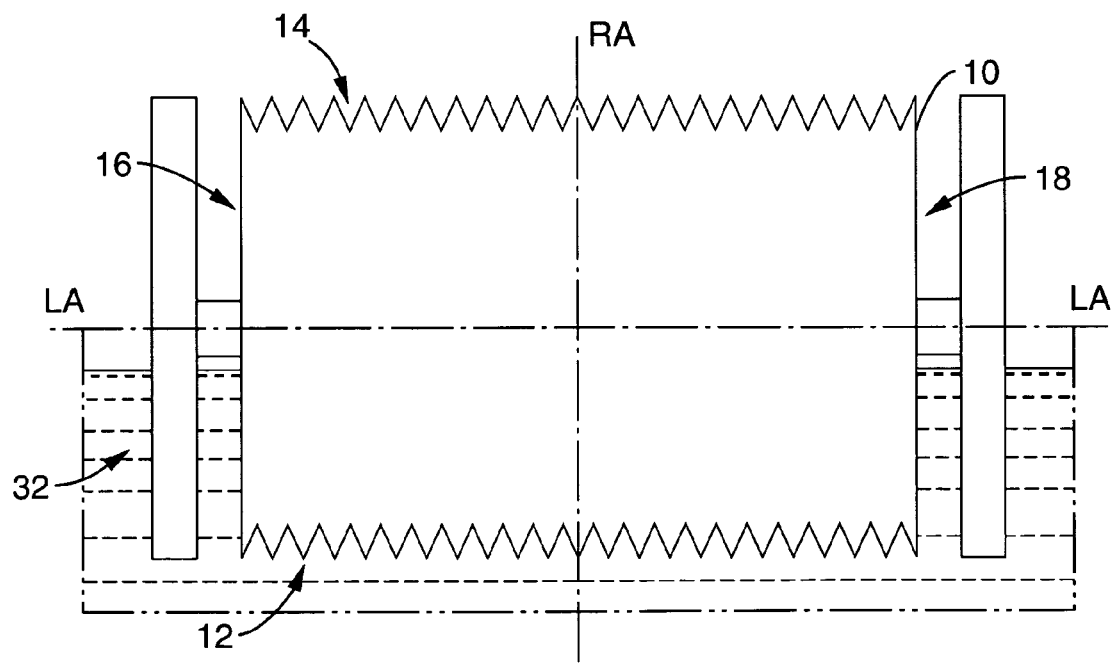
FIG. 2 is a cross-sectional view of the fluid recovery unit shown in FIG. 1 taken through line 2-2.

Referring first to FIG. 1 through FIG. 5, an embodiment of the invention is shown in the context of a rotatable fluid recovery unit 10 typically found in an adhesion (oelophilic) skimmer. Adhesion skimmers are well known in the art and their details will not be described here. Such skimmers are, for example, available from companies such as Elastec/American Marine, Inc.

In the exemplary embodiment shown, the recovery surface 12 of the recovery unit (e.g., drum, disk, or belt) 10 is patterned with a plurality of grooves 14. The grooves 14 are arranged around the circumference of the recovery unit 10 and are substantially parallel to each other between the ends 16, 18 of the skimmer 10. Also, in the embodiment shown, the grooves have a depth "d" and a wall angle "α" which contribute to the ability of the apparatus to recover a viscous fluid. Notably, recovery of the viscous fluid is more effective with narrow grooves rather than wide grooves, provided that the grooves are sufficiently wide to allow for penetration of the grooves by the viscous fluid. In addition, an angle a between the walls 20, 22 of approximately thirty (30) degrees or less is preferable, although wider angles (but preferably less than approximately ninety (90) degrees) are also functional. Furthermore, a groove depth of approximately one inch or less is preferable, although deeper grooves such as approximately five inches or less could be employed as well. Note also that, by making the grooves less deep and hence less wide at the same groove angle, more grooves can be fitted for the same drum width.

Therefore, as can be seen the foregoing, the embodiment of the apparatus shown in FIG. 1 through FIG. 5 includes a rotatable drum 10 having an outer surface 12 and a plurality of grooves 14 in the outer surface. Each of the grooves 14 has a pair of spaced apart walls 20, 22 which define the shape of the groove, and each of the grooves has an inner terminus 24 bordered by the spaced apart walls which defines the depth of the groove. Accordingly, each of the grooves has a depth "d", an exterior width "w", and angle α such that when the drum 10 is placed in contact with a viscous fluid, the fluid collects in the grooves for recovery. The combination of groove depth and wall angle provides for formation of a meniscus and pooling of the viscous fluid on the inner terminus and walls of the grooves, thereby providing increased fluid collection capability.

In a preferred embodiment, the depth of the grooves is approximately one inch or less, and the angle of separation between the walls of the grooves is approximately thirty-degrees or less. It will be noted that the angle slows draining of viscous fluid from the grooves.

In the embodiment shown, the drum has a first end 16 and a second end 18, a central longitudinal axis "LA" extending between the first and second ends, and a central radial axis "RA" that is orthogonal to the longitudinal axis. Here, the grooves are substantially aligned with the central radial axis. While alternative embodiments can include grooves that are angularly offset from the central radial axis by an angle less than approximately ninety (90) degrees, offsetting the grooves in that manner could make it difficult to align the scraper 26 with the grooves for fluid removal.

Figure 6:
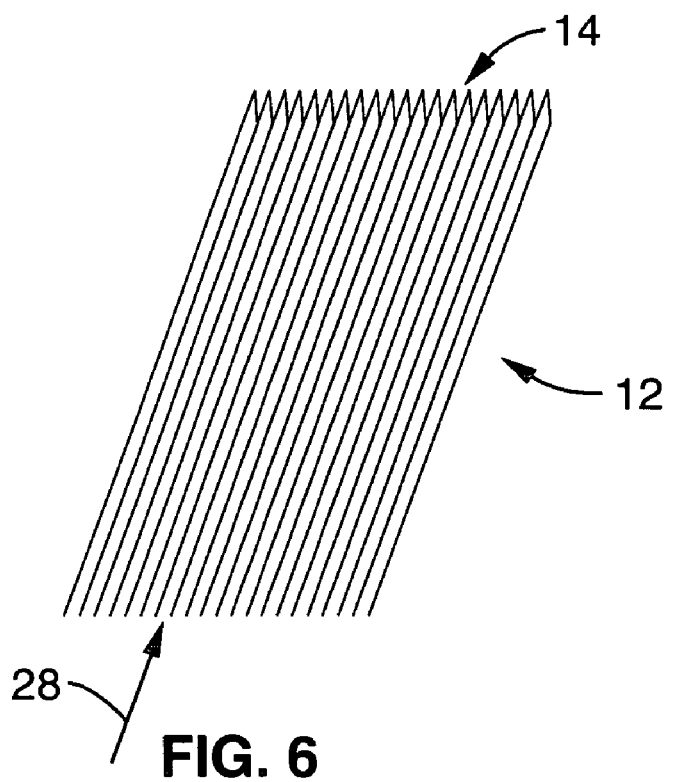
FIG. 6 illustrates the method of oil recovery according to the present invention.

As illustrated in FIG. 6, use of this shape for the recovery surface increases surface area in contact with the fluid 28 to be recovered and uses capillary forces to allow larger volumes of fluid to collect in the confined space of grooves for recovery.

Figure 7:
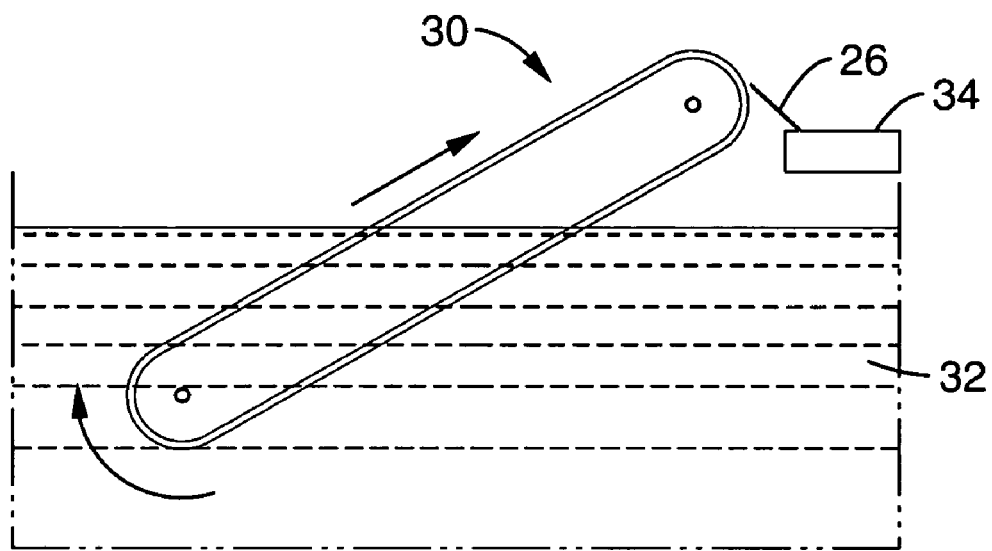
FIG. 7 is a schematic partial side view of a skimmer with an embodiment of a grooved belt-type fluid recovery unit according to the present invention.
Figure 8:
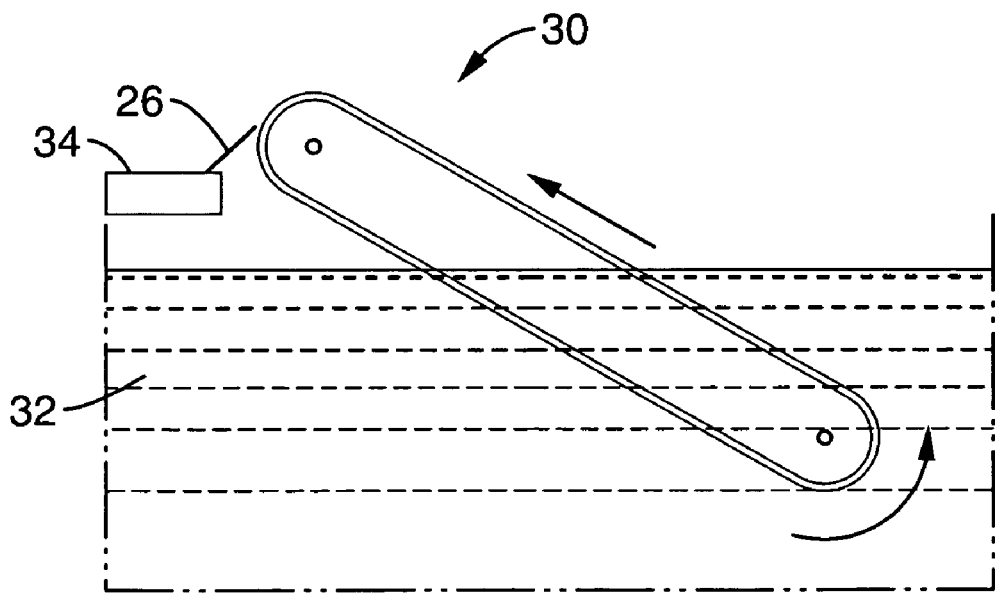
FIG. 8 is a schematic partial side view of an alternative embodiment of a skimmer with the grooved belt-type fluid recovery unit shown in FIG. 7.

It will further be appreciated that the drum, belt, or disk can be inclined at an angle in relation to the water. For example, referring to FIG. 7 and FIG. 8, side views of belt-type skimmers 30 are schematically illustrated, where the skimmer in FIG. 7 rotates in a clockwise direction lifting oil out of the water and the skimmer in FIG. 8 rotates in a counter-clockwise direction transporting oil under water and above the belt towards the scraper. Another recovery mode is for the belt to transport oil under the water and collect it into a pool behind the belt from where oil can be recovered by, for example, a suction skimmer. The angle of inclination in relation to the water 32 is preferably ninety-degrees or less, but withdrawal of viscous fluids at other angles is possible as well.

From the foregoing, it will be appreciated that the system is essentially three dimensional. There can be an angle of orientation of grooves on the recovery surface and there can be another angle of orientation of the recovery surface itself relatively to the water surface.

Figure 3:
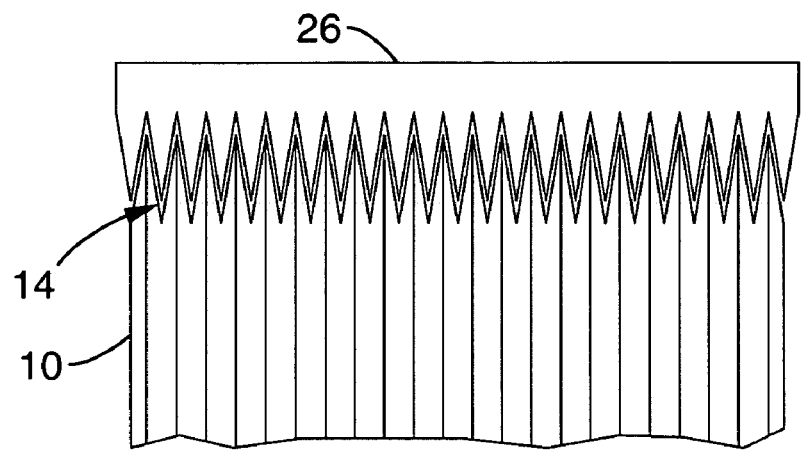
FIG. 3 is a cross-sectional view of the fluid recovery unit shown in FIG. 1 taken through line 3-3 and illustrates the fluid recovery unit in relation to a scraper for removing oil collected on the recovery surface.
Figure 4:
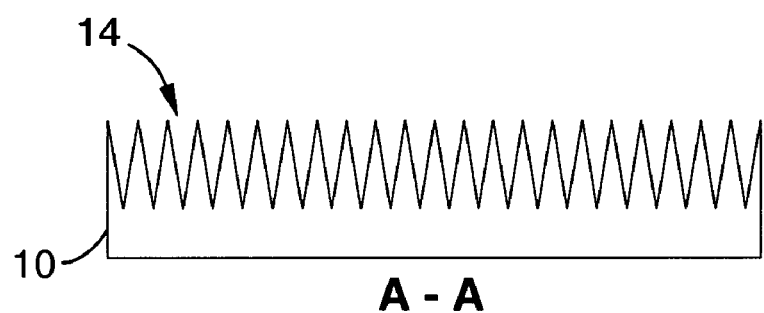
FIG. 4 is a top plan view (bottom figure) of an embodiment of the surface of the fluid recovery unit shown in FIG. 1 and a cross-sectional view (top figure) taken through line A-A of the top plan view.
Figure 4:
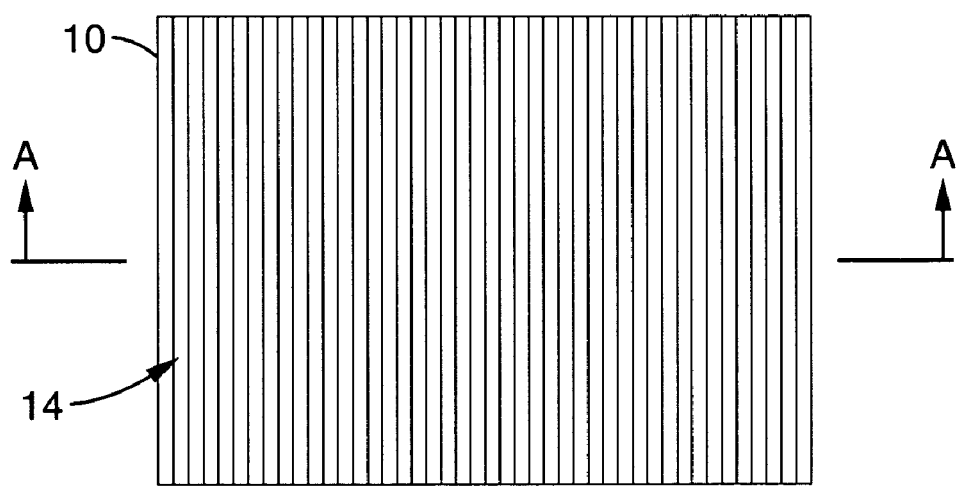
Figure 5:
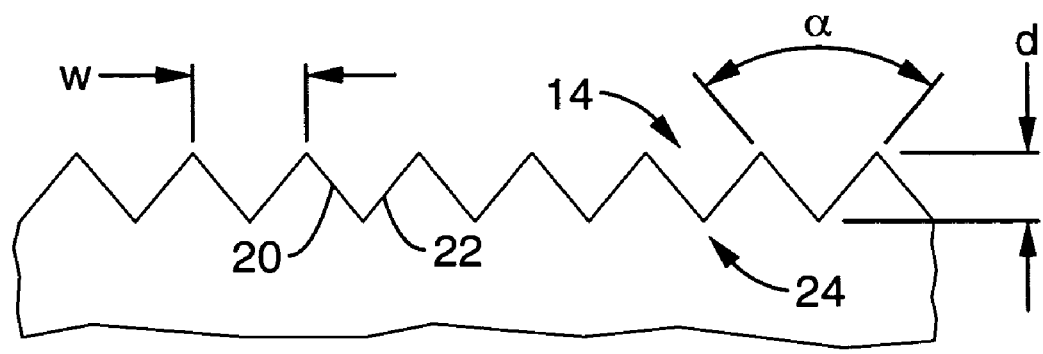
FIG. 5 is a partial cross-sectional view of an embodiment of the surface of the fluid recovery unit shown in FIG. 1.

Referring now particularly to FIG. 1 and FIG. 3, after the viscous fluid is collected on the surface 12 of the fluid recovery unit 10, a scraper 26 would typically be used to remove the viscous fluid for recovery and disposal. In order to facilitate removal of the viscous fluid, the scraper used with the present invention should have an edge geometry that substantially matches (e.g., is substantially complementary to) the surface geometry of the skimmer to that the viscous fluid can be scraped off of the recovery surface and transferred to the collector 34. The scraper should closely mate with the recovery surface for substantially complete and efficient scraping.

Figure 9:
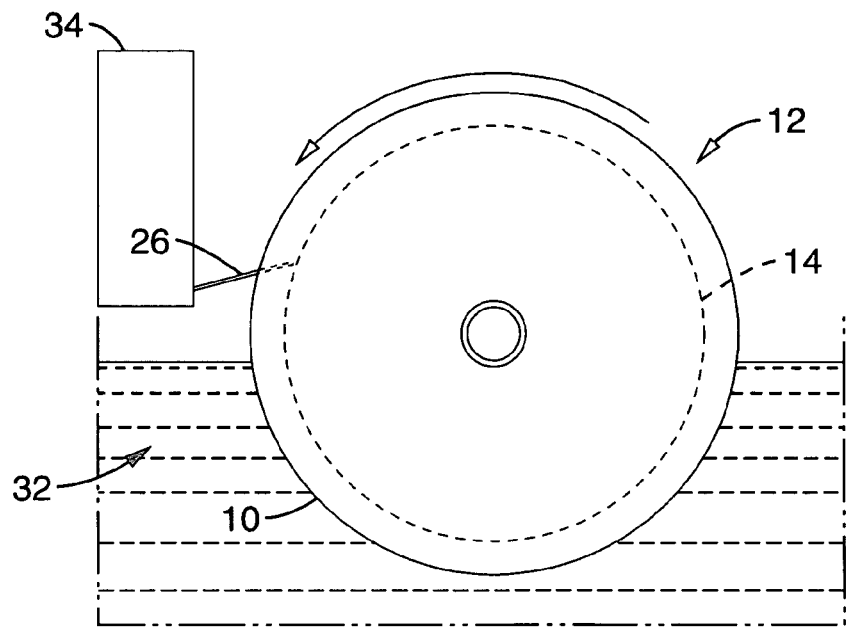
FIG. 9 is a schematic partial side view of a skimmer with an alternative embodiment of the grooved drum-type fluid recovery unit shown in FIG. 1.

Referring to FIG. 1 and FIG. 9, it will also be appreciated that the direction of rotation of the skimmer 10 can be either clockwise or counter-clockwise. More particularly, rotation of the recovery surface can be in either the direction of withdrawal of oil from the water, or in the opposite direction of submerging oil into water and transporting under the recovery surface. The particular direction of rotation chosen will of course influence the position of the scraper 26 and collector 34.

Figure 10:
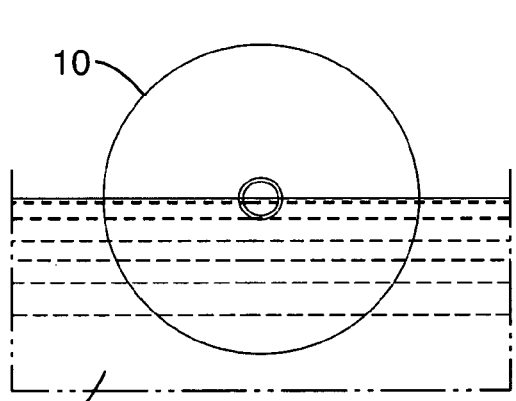
FIG. 10 through FIG. 12 are side schematic views of the fluid recovery unit shown in FIG. 1 positioned at various water depths.
Figure 11:
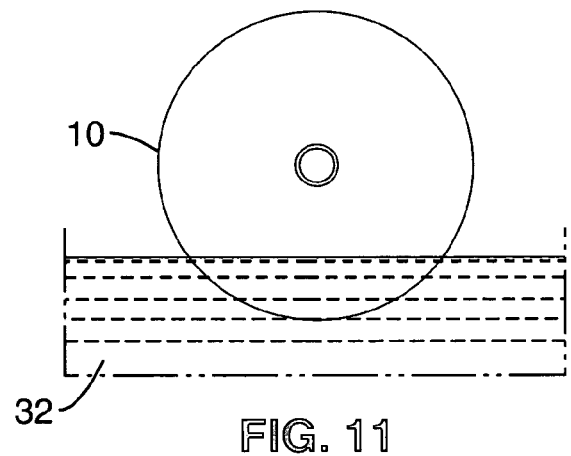
Figure 12:
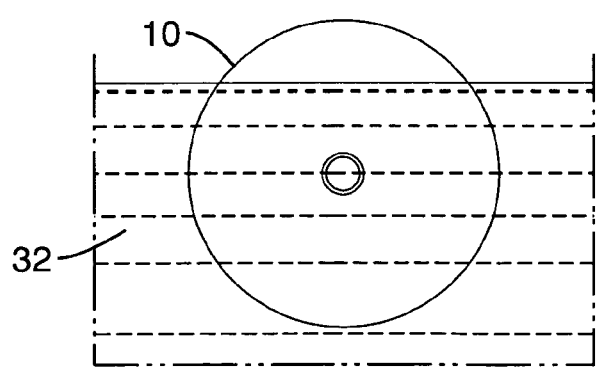

Furthermore, as illustrated in FIG. 10 through FIG. 11, the depth of the skimmer 10 in the water 32 can vary. FIG. 10 shows approximately one-half of the diameter of the skimmer positioned above and below the waterline. FIG. 11 and FIG. 12 show approximately one-third below the waterline and approximately two-thirds below the waterline, respectively.

The inventive geometry of the skimmer surface can be used for any case when adhesion-based separation of liquids is employed. The invention is expected to improve the efficiency of oleophilic skimmers collecting oil (or any other viscous fluid) from the water surface. The most efficient way to use this invention is to replace the existing surface of adhesion skimmers with belts, disks, or drums fabricated from an oleophilic material and modified with the surface geometry described herein. More viscous fluid can be recovered if the angle of withdrawal is less than approximately 90-degrees. The rotation speed of belt/drum should be fast enough to prevent oil drainage down the recovery surface. Use of the most (highest) oleophilic material reasonably available is preferred on the skimmer surface to enhance recovery efficiency.

Figure 13:
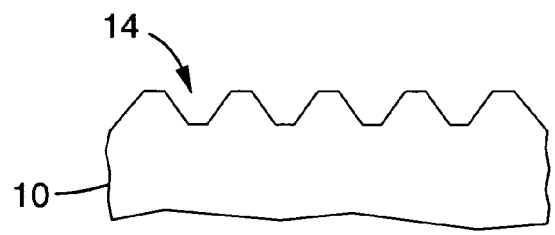
FIG. 13 through FIG. 19 are partial cross-sectional views of various grooved surface configurations that can be employed in a fluid recovery unit according to the present invention.
Figure 14:
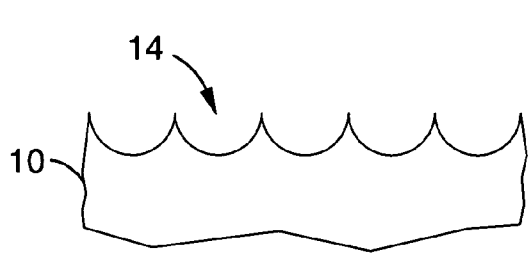
Figure 15:
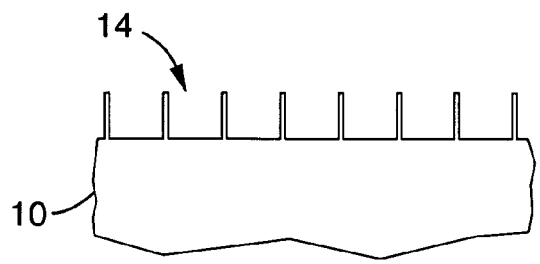
Figure 16:
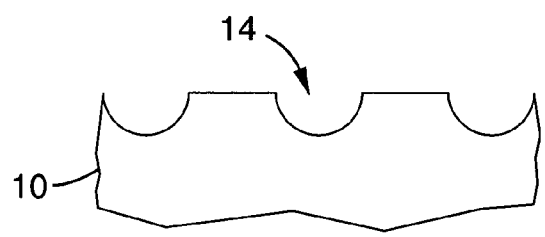
Figure 17:
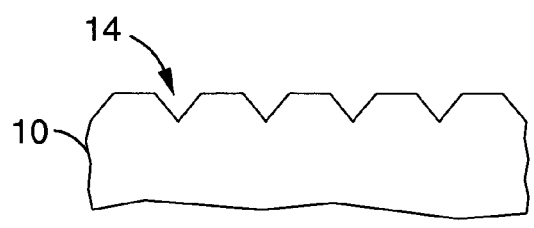
Figure 18:
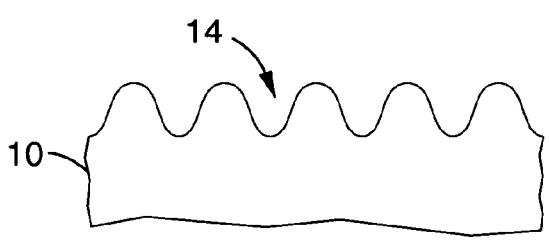
Figure 19:
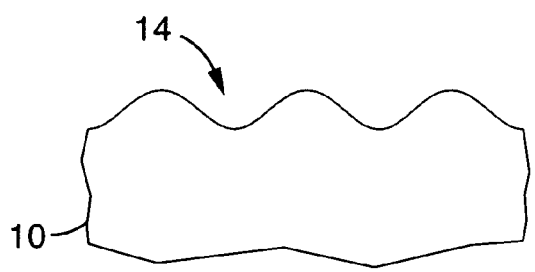

In the embodiment described above, V-shaped grooves are patterned in the surface of the skimmer. However, other shapes can be employed as well, as illustrated by way of example in FIG. 13 through FIG. 19. The modified V-shaped configurations of FIG. 13 and FIG. 17 have flat outer surfaces that facilitate being able to set the skimmer on a hard surface without damage. Other groove configurations selected would depend on the properties of fluid to be recovered.

It will be appreciated that a V-patterned surface maximizes the surface area of the drum. Depending on the angle and the depth of the grooves, the surface area can be increased several-fold for the same width of recovery surface. It also allows menisci to be formed in the depth of the groove, increasing the amount of recovered oil and slowing down oil drainage. The variation of groove opening with groove depth allows it to be efficiently used on oils with a wide range of viscosities. The lighter oils will be collected in the depth of the grooves, while viscous oils can be collected in a wider part of the groove allowing water drainage in the deeper part of the groove. The scraper should be made to match the recovery surface. If V-patterned surfaces with a matching scraper are used, close to 100% of adhered oil can be removed and transferred into the oil collector.

Note also that the angle of oil withdrawal from the oil spill affects the formation and thickness of the adhered oil film. If oil is withdrawn at a sharp angle (0-90 degrees), it forms a thicker film on the surface because the effect of gravity is reduced by the presence of the recovery surface underneath the film. In this case, drainage of oil is relatively slow. If oil is withdrawn at the angle larger than 90 degrees, gravity force is not compensated by the substrate and the rate of oil drainage from the surface is significantly higher. This leads to formation of much thinner oil film and, hence, lower recovery efficiency. Although a 90-degree withdrawal angle allows more efficient oil recovery than a wider angle, a V-patterned surface (or any recovery surface for that matter) can be used to withdraw oil at angles of less than 90 degrees to maximize the thickness of recovered film.

EXAMPLE 1

Test Surfaces

Figure 20:
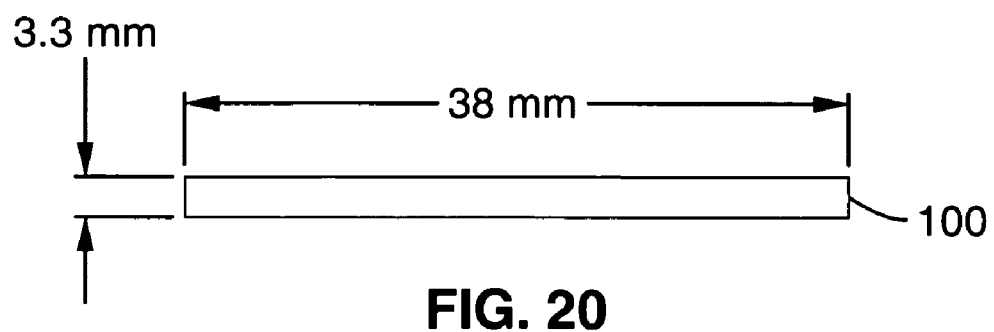
FIG. 20 and FIG. 21 are side and plan views, respectively, of a flat test surface for a fluid recovery unit.
Figure 21:
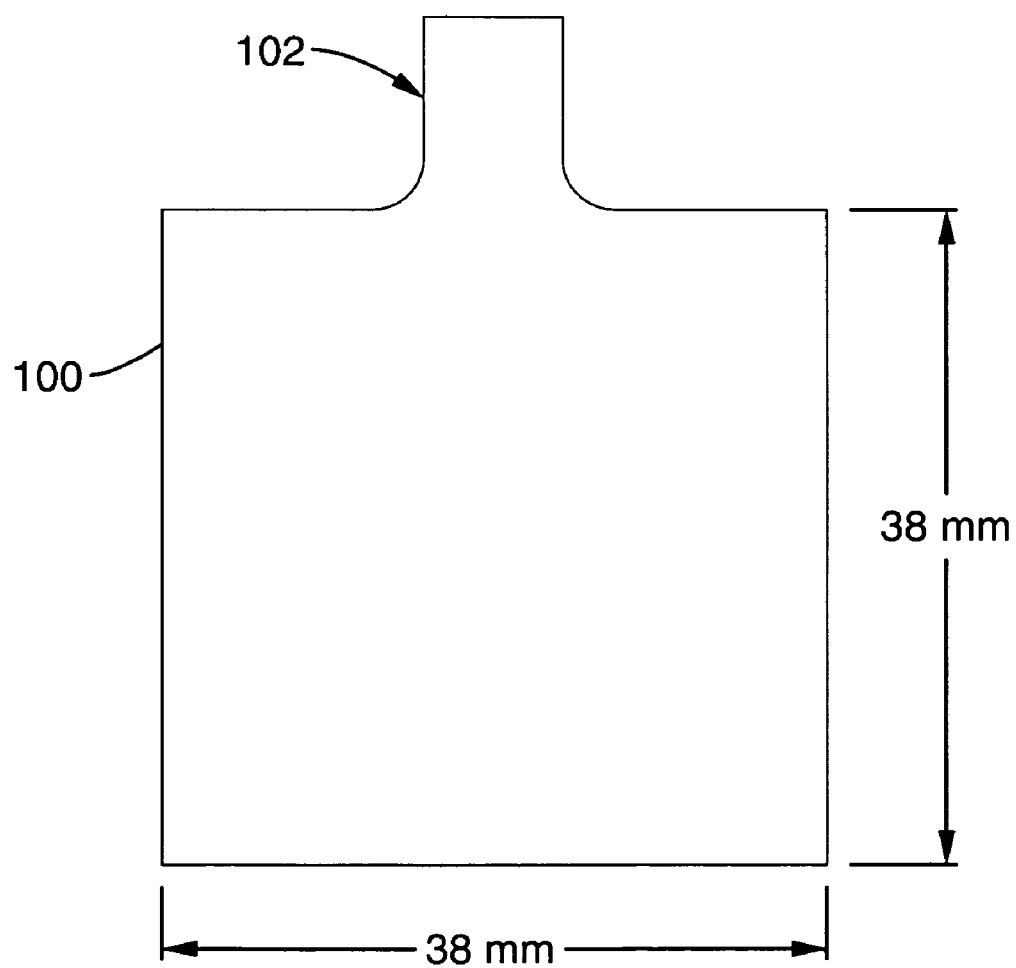
Figure 22:
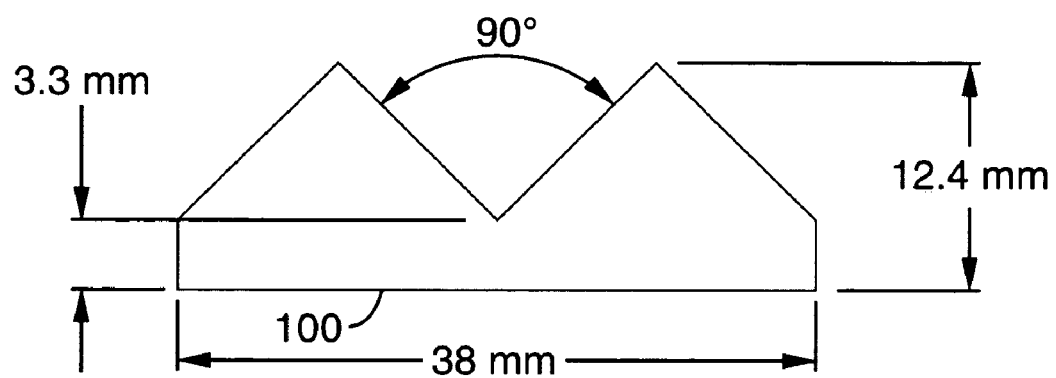
FIGS. 22 and 23 are side and plan views, respectively, of a grooved test surface for a fluid recovery unit with straight walls at ninety-degree angles.
Figure 23:
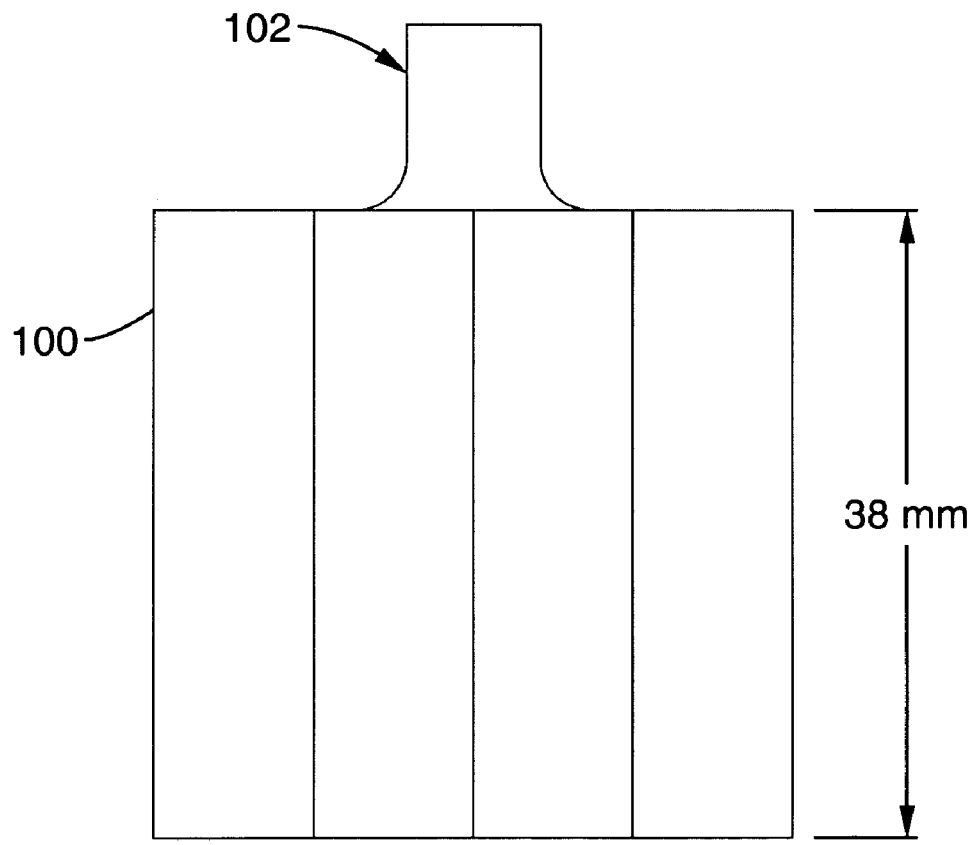
Figure 24:
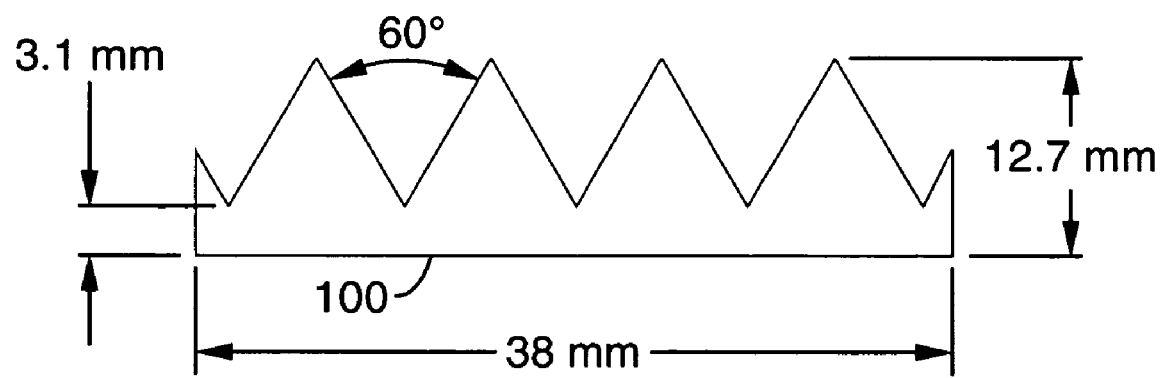
FIGS. 24 and 25 are side and plan views, respectively of a grooved test surface for a fluid recovery unit with straight walls at sixty-degree angles.
Figure 25:
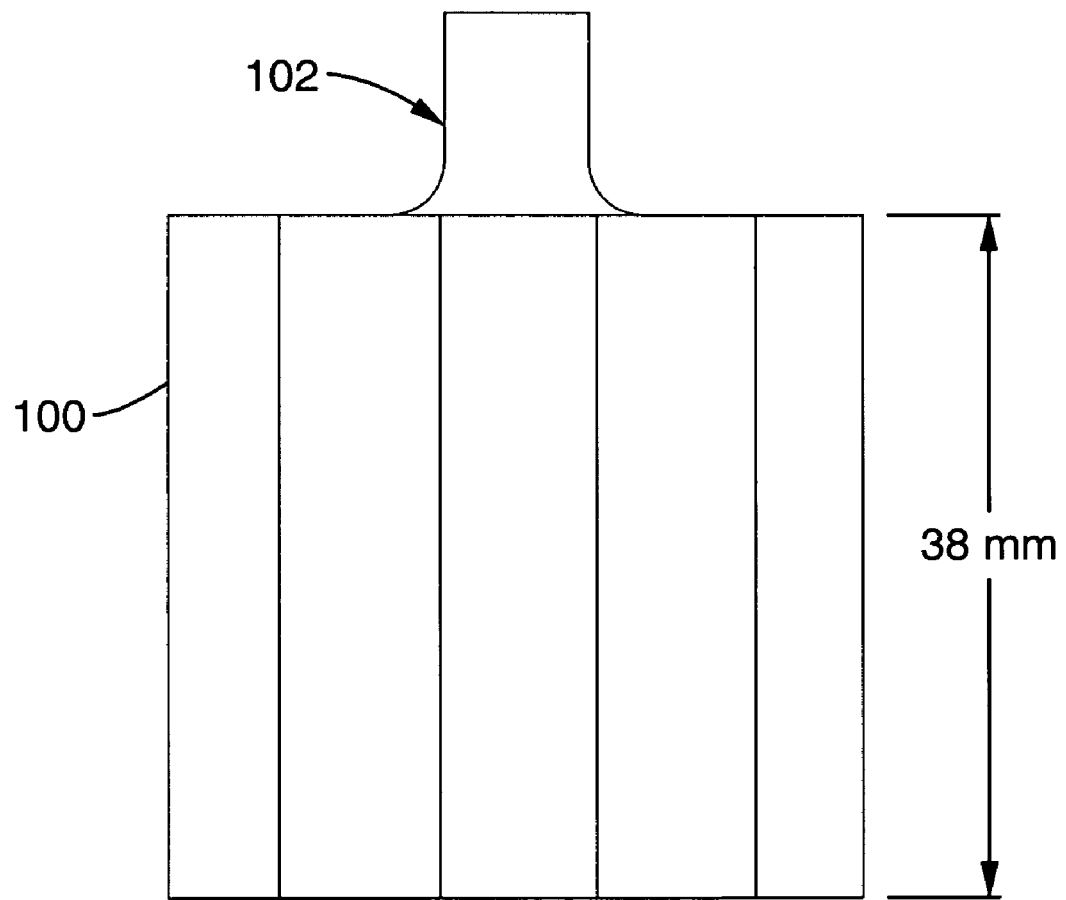
Figure 26:
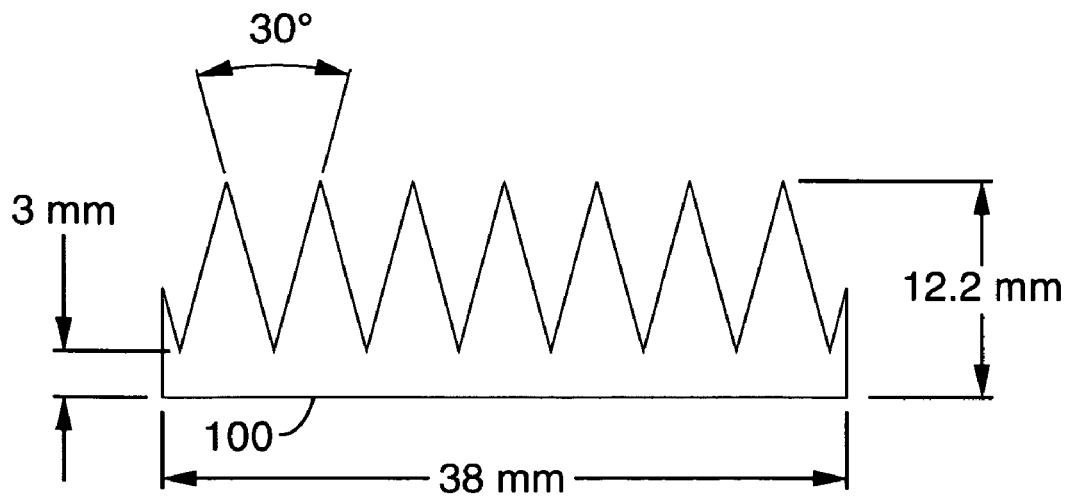
FIGS. 26 and 27 are side and plan views, respectively of a grooved test surface for a fluid recovery unit with straight walls at thirty-degree angles.
Figure 27:
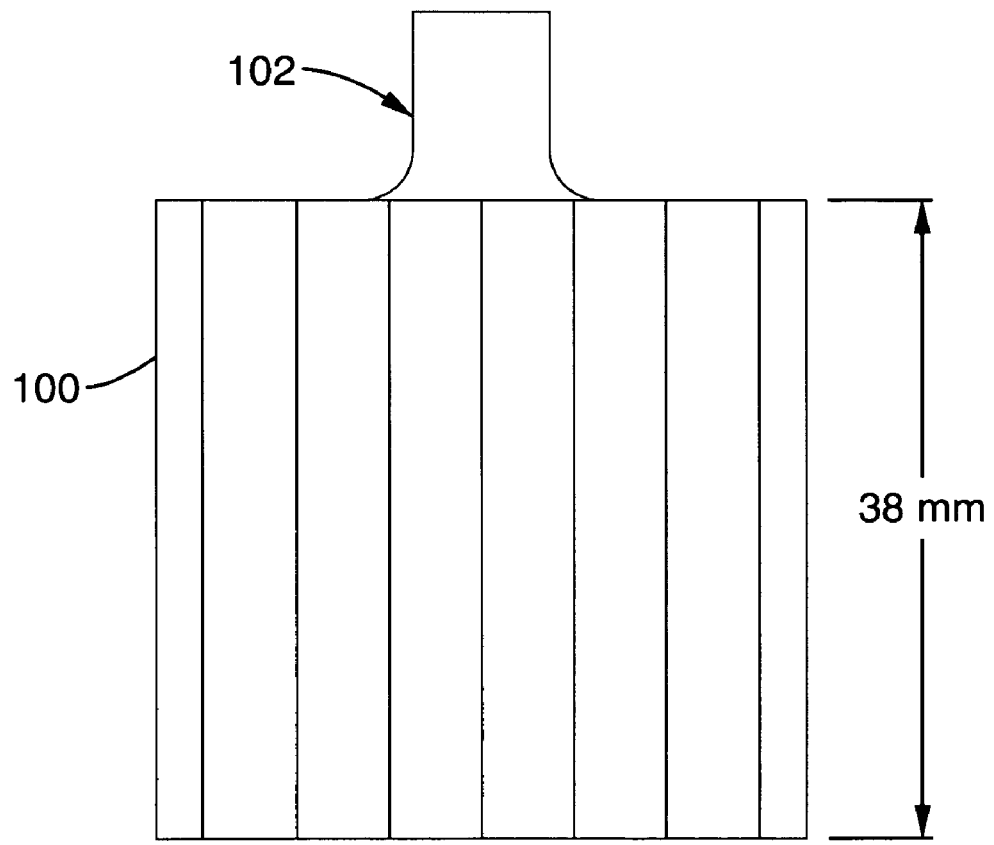
Figure 28:
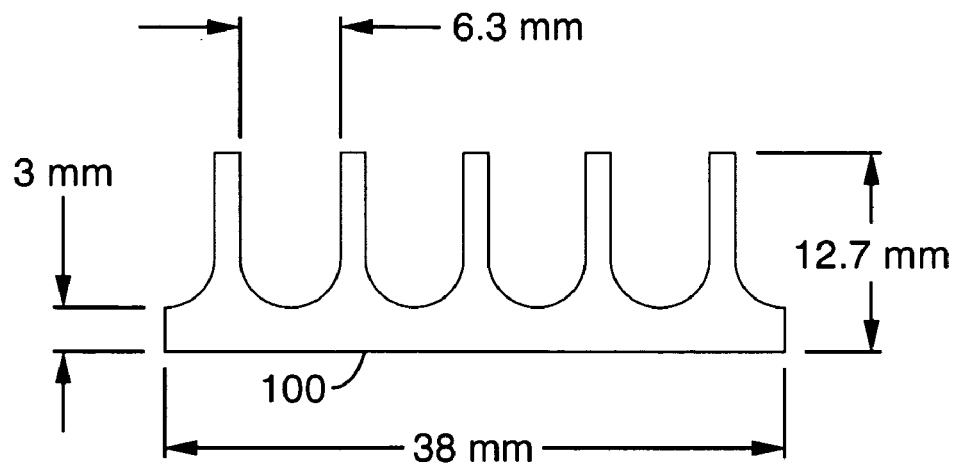
FIGS. 28 and 29 are side and plan views, respectively of a grooved test surface for a fluid recovery unit with curved grooves having small diameter curves.
Figure 29:
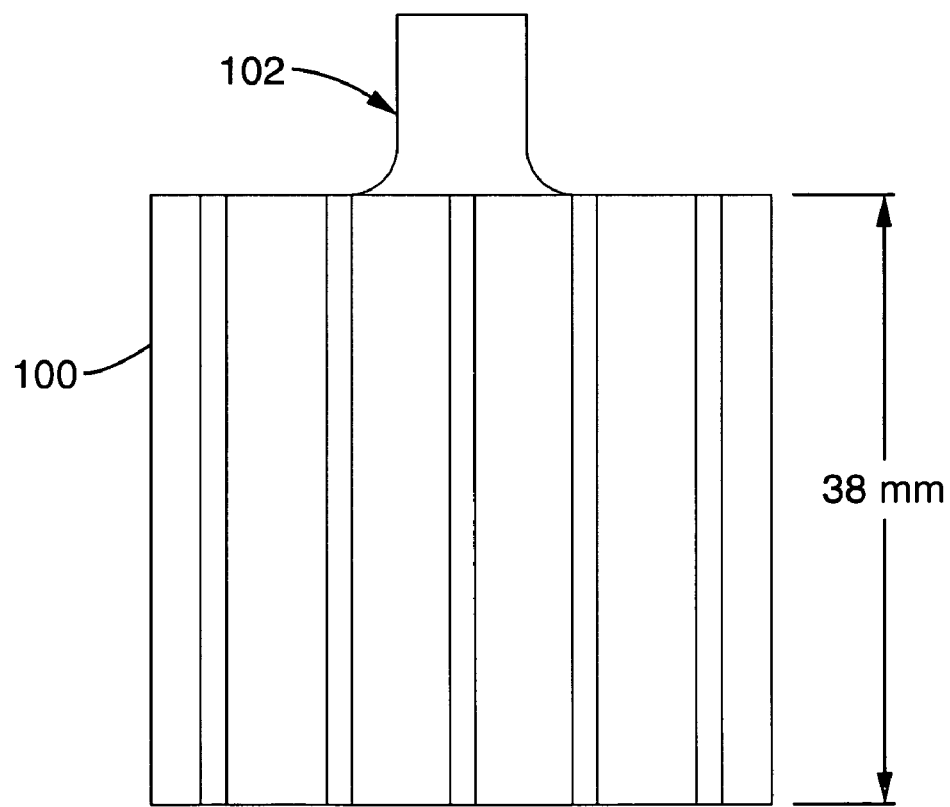
Figure 30:
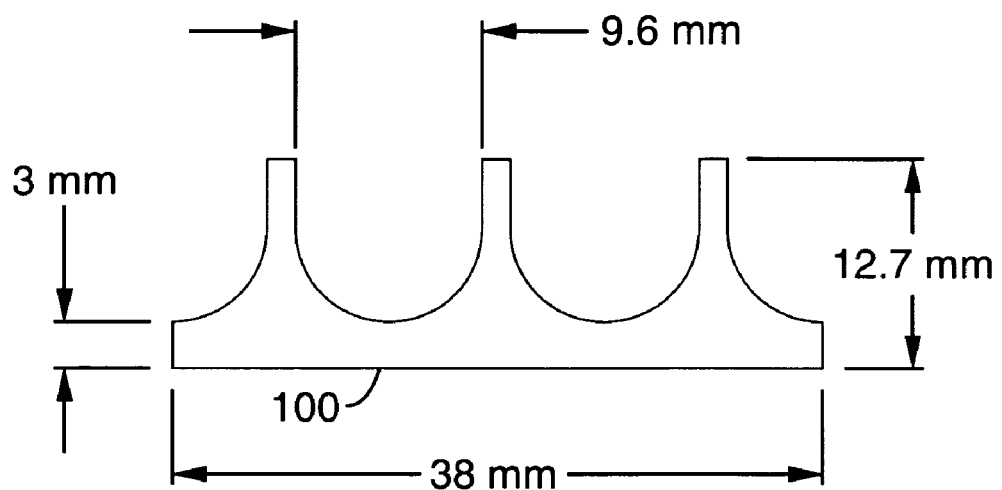
FIGS. 30 and 31 are side and plan views, respectively of a grooved test surface for a fluid recovery unit with curved grooves having large diameter curves.
Figure 31:
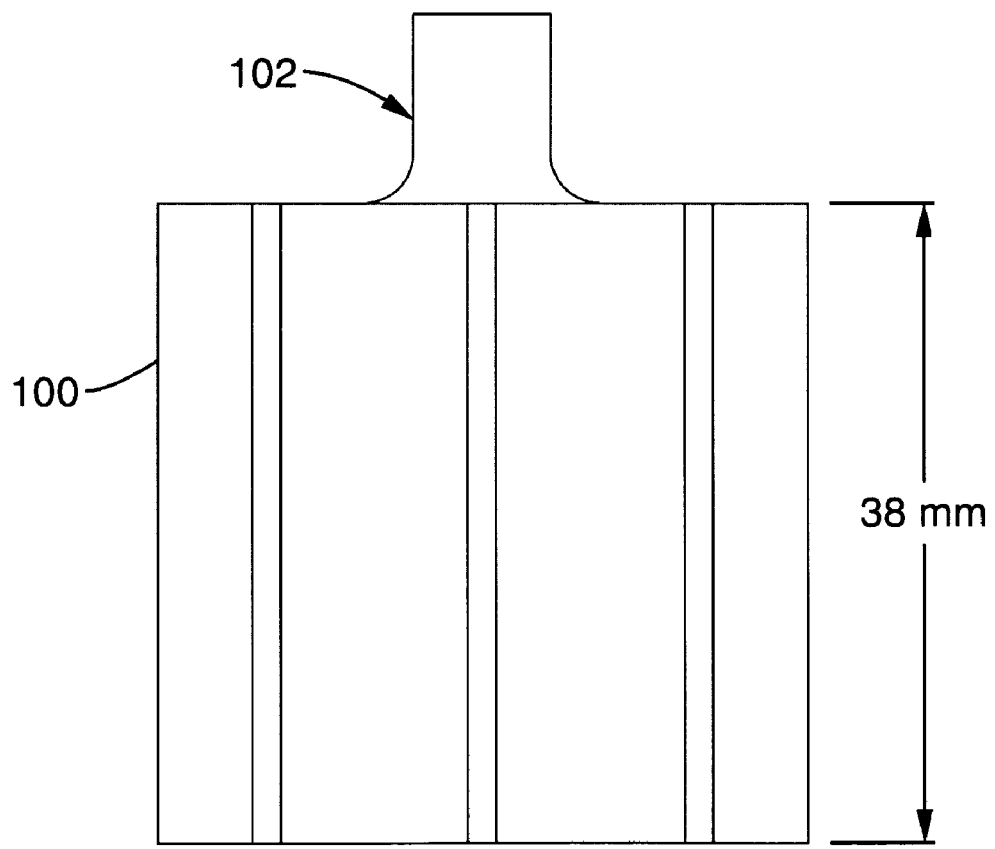

A number of surface patterns were manufactured from the aluminum plates in order to study the effect of surface pattern on the recovery efficiency. Test surfaces studied are illustrated in FIGS. 20 through 31. A flat test surface is illustrated in FIG. 20 and FIG. 21, test surfaces having grooves with a V-shaped cross-section are illustrated in FIG. 22 through FIG. 27, and test surfaces having grooves with a rounded cross-section are illustrated in FIG. 28 through FIG. 31.

It will be appreciated that the surface area can be significantly increased by introducing the grooves with sharper angles, as illustrated in Table 1. The surface area of the grooved side can be increased up to three times if a flat surface is replaced with a surface with 30-degree grooves. This will not directly translate to a 3-times higher recovery rate, as oil collected in the depth of the groove is attached to two sides of the grove at the same time. Nevertheless, the V-patterned surface has significantly higher surface area compared to the flat surface, and hence it will allow higher oil recovery rate for the same width of the drum/belt.

In addition to V-shaped grooves, one can also have other configurations, as shown in FIG. 28 through FIG. 31. Some configurations may lend themselves to easier machining on a drum or belt skimmer, and thus we are exploring all the possible geometric configurations. Further research into the advantages and disadvantages of each geometry would be useful.

EXAMPLE 2

Research Method

Experiments were carried out in the temperature controlled room at 25° C. (±1° C.). The test procedure was similar to the dip-and-withdraw test described in Jokuty, P., et al., "Oil adhesion testing—recent results", Proceedings from the Nineteenth Arctic Marine Oil spill Prog. Tech. Seminar, Canada, (1996).

Oil recovery at fast speed was performed using a stepping motor. The experiment setup included a computer, a scale connected to the computer, a beaker to hold water and oil, a test surface, a sample holder, and a motorized support for moving the sample holder vertically.

Test samples were pre-cleaned with soapy water, ethanol and de-ionized water, blow-dried under a stream of nitrogen and left in the temperature controlled room for at least 24 hours prior to the test. A beaker was filled with 50 ml of filtered seawater from Santa Barbara Channel (salinity of about 33.6 ppt). Then 5 ml HydroCal 300 was carefully added on top of the water surface. The beaker was installed on the scale connected to the computer.

A test surface 100 was coupled to a sample above the oil surface using an attached handle 102. The sample holder was moveable vertically using a programmed stepping motor in a way that test surface could be submerged into oil-water mixture on 20 mm and then withdrawn. The speed of withdrawal was 74 mm/s. Once the oiled surface was withdrawn from the beaker, the scale detected the maximum oil loss and then generated the signal to plot the increase of oil mass in the beaker caused by oil drainage from the plate and droplets of oil falling back into the beaker. From the shape of these curves, the effect of the recovery and oil properties was analyzed. From five to ten tests were performed for each test surface to ensure accuracy of data. New oil was used for each test.

EXAMPLE 3

Results and Discussion

Figure 32:
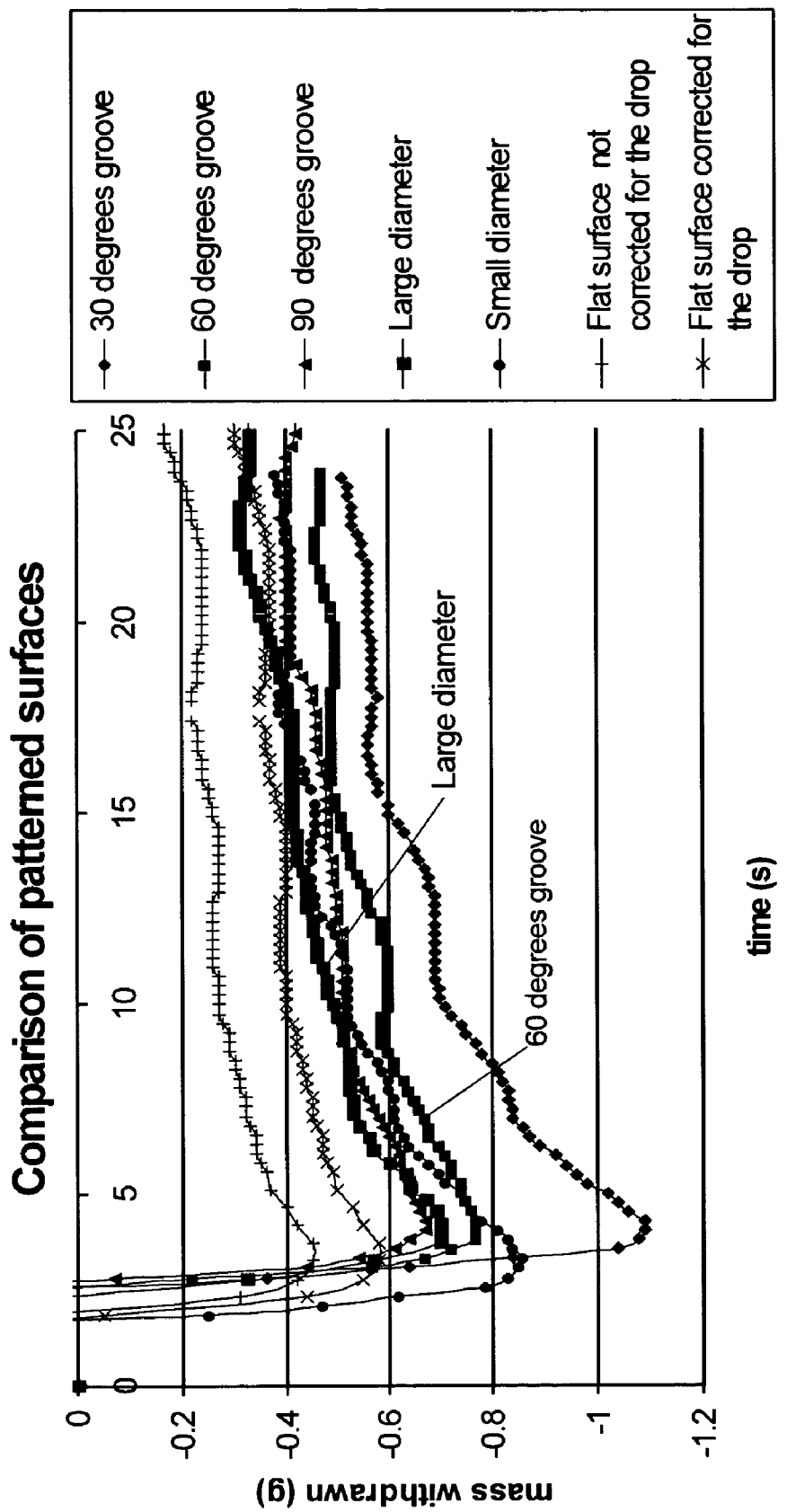
FIG. 32 is a graph comparing drainage curves for the test surfaces shown in FIG. 20 through FIG. 31.

Drainage curves for the various patterned surfaces are presented in FIG. 32, compared to a flat surface. The initial weight of the beaker with seawater and the oil layer was zeroed out. Oil recovery was thus measured as a negative change in mass. Zero time represented the start of the withdrawal process. At around four seconds the test surface was completely removed from the beaker. That point represented the maximum mass of oil adhered to the test surface, before oil began draining back to the beaker as oil droplets. After about twenty-five seconds, oil drainage stopped in most cases. The final recovered mass was found by averaging the data at the end plateau section of the curve.

Figure 33:
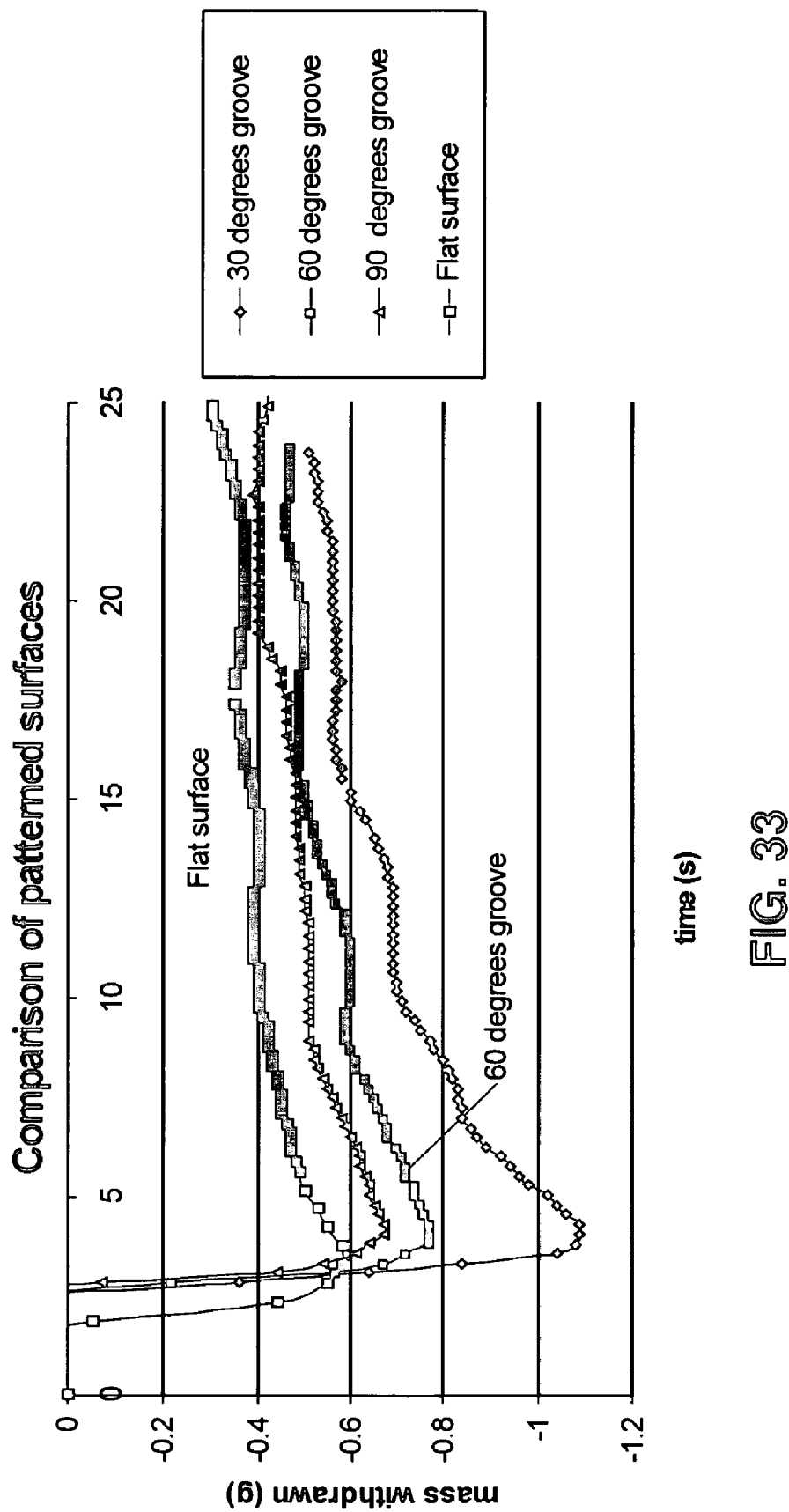
FIG. 33 is a graph comparing oil recovery curves for the flat and V-shaped test surfaces shown in FIG. 20 through FIG. 27.

The data presented in FIG. 32 shows that there is a significant difference between the amount of oil recovered by the patterned surfaces. The flat surface data had to be corrected to accommodate the fact that the flat surface had a smaller surface area of the bottom part than grooved surfaces. The grooved surfaces had comparable size of bottom areas. By calculating the weight of the drop corresponding to the bottom surface area of grooved samples allowed to shift a curve for a flat sample to a new position that allows comparing recovery properties of the recovery surfaces and exclude the effect of presence of the drop at the bottom of the samples after withdrawal. FIG. 32 shows that recovery efficiency can be doubled with a 30-degree surface pattern instead of a flat surface. Recovery increases with decreasing angle, but at some point there is a limit to the amount of oil in the groove, which we did not explore. Grooves with rounded cross-sections appeared to be less efficient than the triangular-shaped grooves. The effect of groove angle for V-shaped grooves is presented in FIG. 33. It was found that decreasing angle increases the oil recovery for a given oil.

Figure 34:
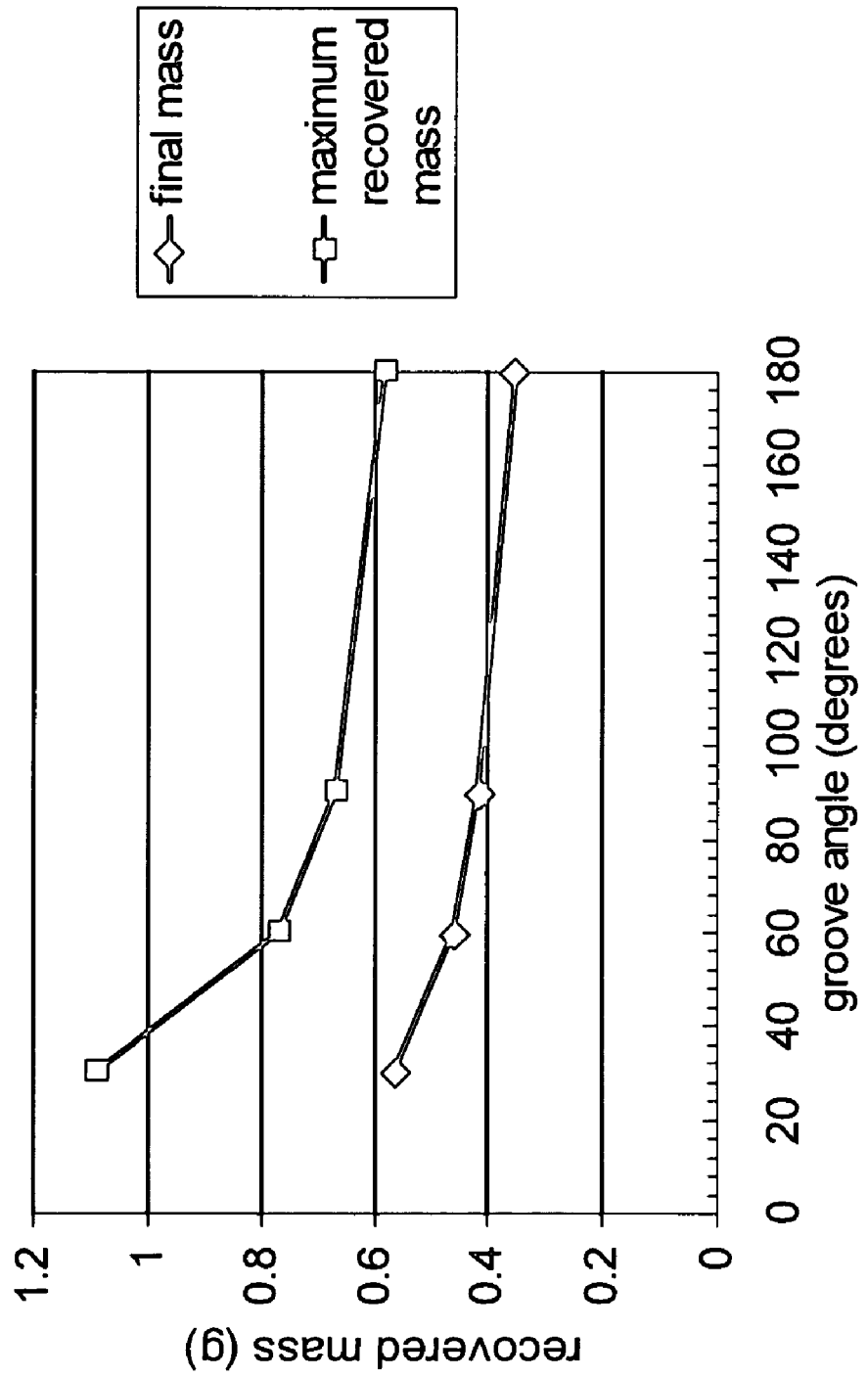
FIG. 34 is a graph showing maximum initial oil recovery and final oil recovery after drainage as a function of groove angle.

FIG. 34 summarizes the initial (maximum) oil removal from the water surface, and the final removal after the oil drained back to the beaker, for the various surface patterns. The upper line corresponds to the maximum amount of oil that can be recovered at a withdrawal speed of 74 mm/s, while the lower line corresponds to the final oil remaining on the surface after drainage. The former illustrates the recovery at faster speeds and the later illustrates the recovery at the very slow speed. Overall recovery efficiency increases with decreasing groove angle since a smaller angle retains a larger meniscus in the groove and slows down oil drainage. However, for very viscous oils and emulsions, the opening of the groove should be wide enough for oil/emulsion to enter the groove. There is thus a minimum groove angle that may be dependent on oil properties. Grooves with a smaller angle also increase the surface area of the drum per unit width allowing more oil to attach to the surface as illustrated in Table 1.

Note that skimmer rotational speed may also play an important role. The effect of the grooves on oil recovery by drums in a full-scale test may be even more pronounced than the one observed in the laboratory and oil recovery efficiency may be higher, due to the difference in the hydrodynamics of the process. The recovery speed should be high enough to bring the maximum amount of collected oil to the scraper and prevent it from draining down. A limiting factor may be water entrainment at high speeds, which can break the oil film. Once the oil film is broken, the contact between oil and recovery surface at very high rotational speeds can be lost, resulting in decreasing recovery. High rotational speeds can also emulsify the oil, which results in higher water uptake and may reduce the overall oil recovery rate. The desired rotational speed can be determined experimentally with a full-scale test, and is likely to depend on (1) surface material; (2) withdrawal angle; (3) oil properties; and (4) temperature.

Accordingly, in the present invention the recovery surface is patterned with grooves on a small scale in a configuration that allows for the meniscus to be formed as well as for the oil to "pool" on the bottom (inner terminus) of the groove, providing much larger amount of oil recovered than oil that simply coats a surface in one layer. In addition, by designing these small grooves so as to have wall angles of approximately thirty-degrees or less, there is slowing of the viscous fluid drained out of the groove can be slowed between capture in the water and rotation to the cleaning device.

The present invention increases the contact with the viscous fluid to be recovered, which itself increases the volume of recovered fluid. It also uses the capillary effect, allowing larger volumes of fluid to collect in the confined space of grooves and hence to be recovered. The grooved structure allows the skimmer to be used efficiently on fluids of different properties. Less viscous liquids will be collected in the narrow deep part of the grooves; liquids with higher viscosity might not be able to penetrate that far and adhere to the groove walls in its widest part, allowing less viscous liquid (water) to drain down in the deep part of the groove. The invention allows a thicker film of fluid to be formed on the recovery device and withdrawn. It is also ensures that close to 100% of the recovered fluid can be removed from the recovery surface (scraped) into the collection device. A scrarper made of oleophobic material having a shape matching the geometry of the grooves should be used for these purposes.

EXAMPLE 4

Field Tests

Field scale tests were carried out at the Ohmsett National Oil Spill Response Test Facility. Novel materials and surface patterns were used to retrofit the recovery drums on an existing skimmer at Ohmsett. These drums were installed in a standard skimmer body and used to recover an oil slick while monitoring major recovery parameters. The effect of each design or operational variable on oil recovery efficiency was evaluated.

Materials:

Five materials (Aluminum, Polyethylene, Polypropylene, Neoprene, and Hypalon) were used to manufacture smooth drum surfaces. In addition, three drums had a groove pattern (30° angle, 1 inch deep) machined out of aluminum and coated with Neoprene and Hypalon. One aluminum drum was left uncoated. A scraper was made to match the grooved pattern. FIG. 1 illustrates two grooved drums.

In order to eliminate the variables that could be introduced by using different skimming systems, a frame-type drum skimmer (Elastec Minimax) was used for all tests. This skimmer uses a drum that is rotated through the oil layer. The adhering oil is subsequently removed by a plastic blade to an onboard recovery sump.

Test Oils:

Diesel, Endicott (an Alaskan crude oil), and HydroCal 300 (a lubricant oil) were used during the Ohmsett tests to study the effect of oil properties on the recovery efficiency. These oils have significantly different properties as illustrated in Table 2, which allowed us to test the recovery surfaces on a wide range of possible recovery conditions. Diesel was only tested during the second test, at colder temperatures, since it was added later to the protocol.

Test Procedure

The tests at Ohmsett were carried out in two trips. During the first trip, the average ambient temperature was about 25-30° C. During the second trip, the average ambient temperature was about 10-15° C. The objective was to simulate oil spill under warm and cold water conditions, to determine the effect of temperature and oil viscosity on overall oil spill recovery efficiency.

During the tests, a skimmer assembly was secured in the center of a test tank located on the deck of the Ohmsett facility. Slick thickness was controlled to remain at a predetermined level throughout a given test. As the oil skimmer recovered oil from the test tank, additional oil was pumped from the oil reservoir at the same rate. In this way, real-time control of the slick thickness can be controlled to within ±20%. Most runs were conducted for 5 minutes, although some were conducted for less time (3 minutes) if the conditions were very similar.

The oil skimmer drum speed of rotation was controlled with a hydraulic system provided with the Elastec MiniMax system. Three rotation speeds (30, 40 and 70 rpm) were used for most of the tests. The first two speeds represented the regular operational conditions of a drum skimmer, with minimal free water skimming. The 70 rpm speed represented the maximum rotational speed that was achieved by this particular skimmer. At this speed, more oil was collected, but more free water was entrained by the skimmer, particularly for thinner oil slicks (10 mm). A higher rotational speed also emulsified the oil to a greater extent.

At the end of each test run, the total amount of fluids (oil and water) was measured, the water was taken out from the bottom for several minutes until no more free water was evident, and the remaining oil or oil emulsion was measured again. A sample of the oil or oil emulsion was taken to measure the water content in the Ohmsett laboratory. This data, along with recovery time, were used to establish recovery rates and efficiency.

Figure 35:
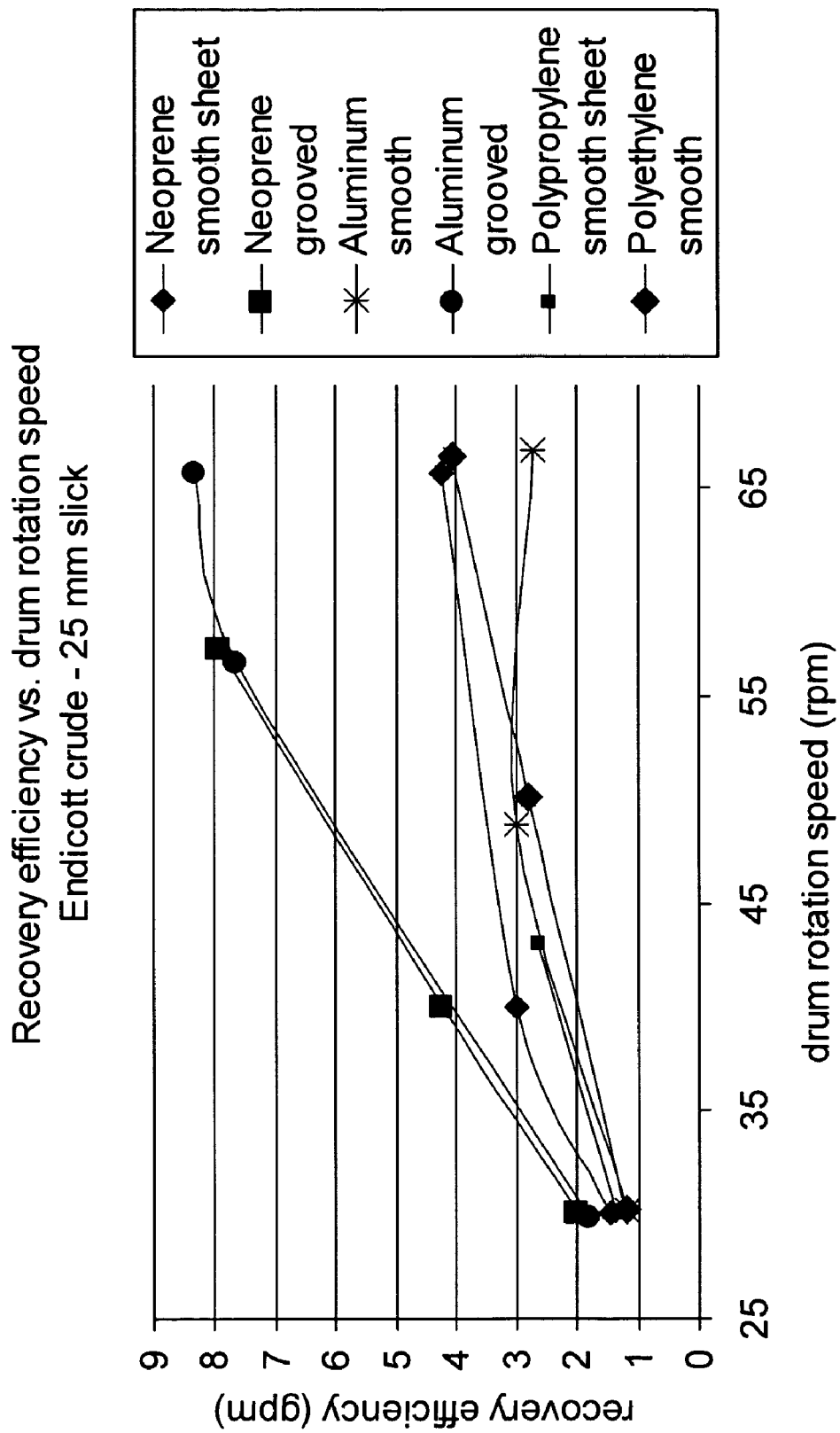
FIG. 35 is a graph showing the results of recovery tests for Endicott crude oil at 25 mm oil thickness at 25-30° C.
Figure 36:
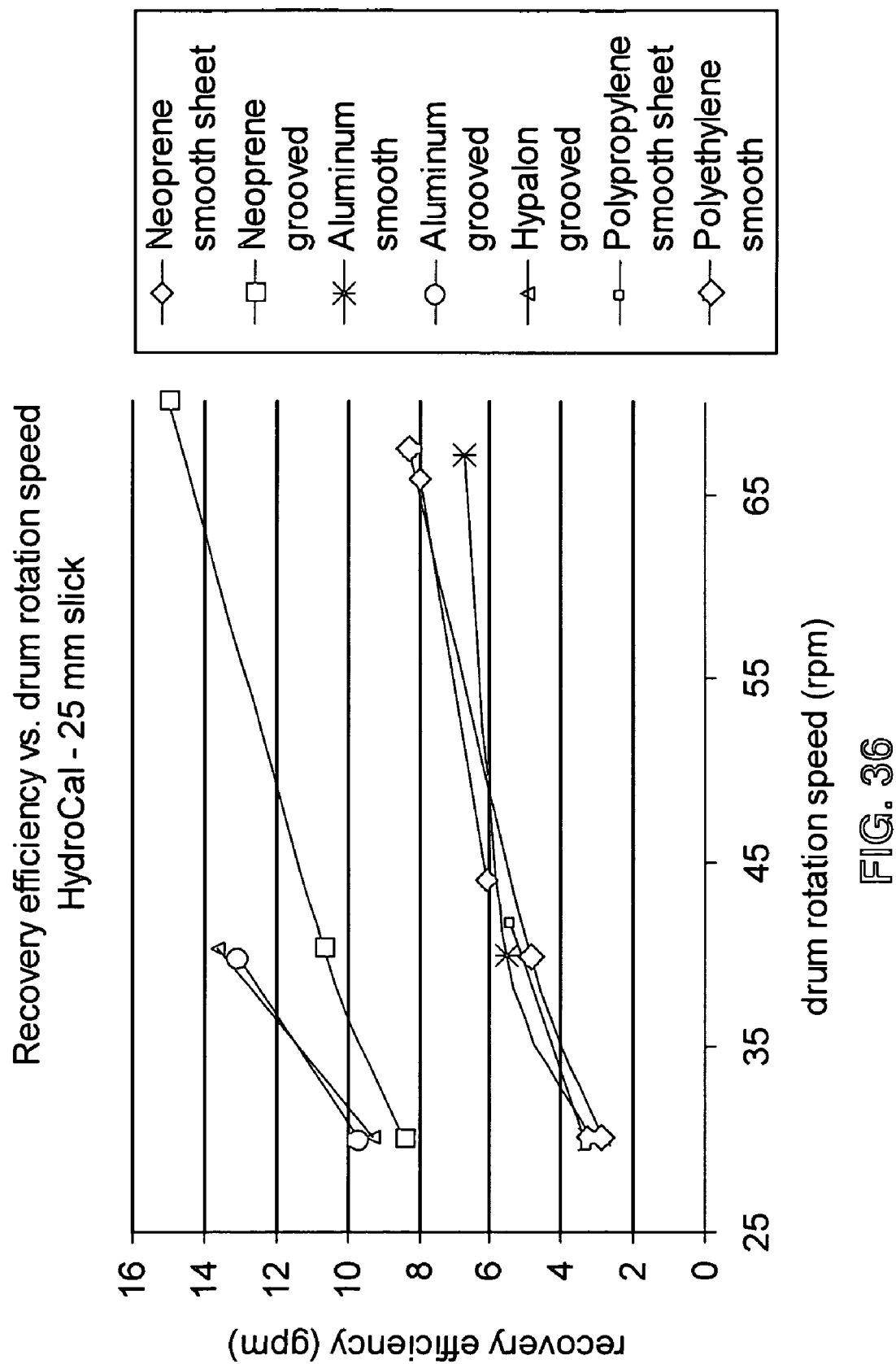
FIG. 36 is a graph showing the results of recovery tests for HydroCal 300 at 25 mm oil thickness at 25-30° C.

Test Results:

The recovery efficiency of various skimmer drums tested with Endicott and HydroCal 300 (for a oil slick thickness of 25 mm) during the first phase of the experiments is presented in FIG. 35 and FIG. 36. The ambient temperature during the first test ranged from 25-30° C. The oil recovery rates in gallons per minute (GPM) were estimated from the calculation of oil recovered per unit time. Free water and emulsified water in the recovered oil were subtracted from the volume of the total recovered liquid. These figures show that there is about a 20% difference in the recovery efficiency of smooth drums covered with various materials.

The difference between smooth and grooved drums was much more significant. For both oils, grooved drums recovered more than two times more oil than smooth ones. A slight decrease in the recovery rates at 70 rpm can be explained by the higher amount of free water picked up by the drums, thereby decreasing the net amount of oil recovered.

At a 25 mm oil spill thickness, grooved drums recovered an amount of water that was comparable to the amount of water recovered by smooth drums. Some deviations in results might have been caused by the fact that some runs were performed with oil that was emulsified during the previous run. The water content of some recovered oils was as high as 8%. It was observed that HydroCal emulsified easily and had higher water content than Endicoft oil, which influenced the overall recovery of free and emulsified water.

Figure 37:
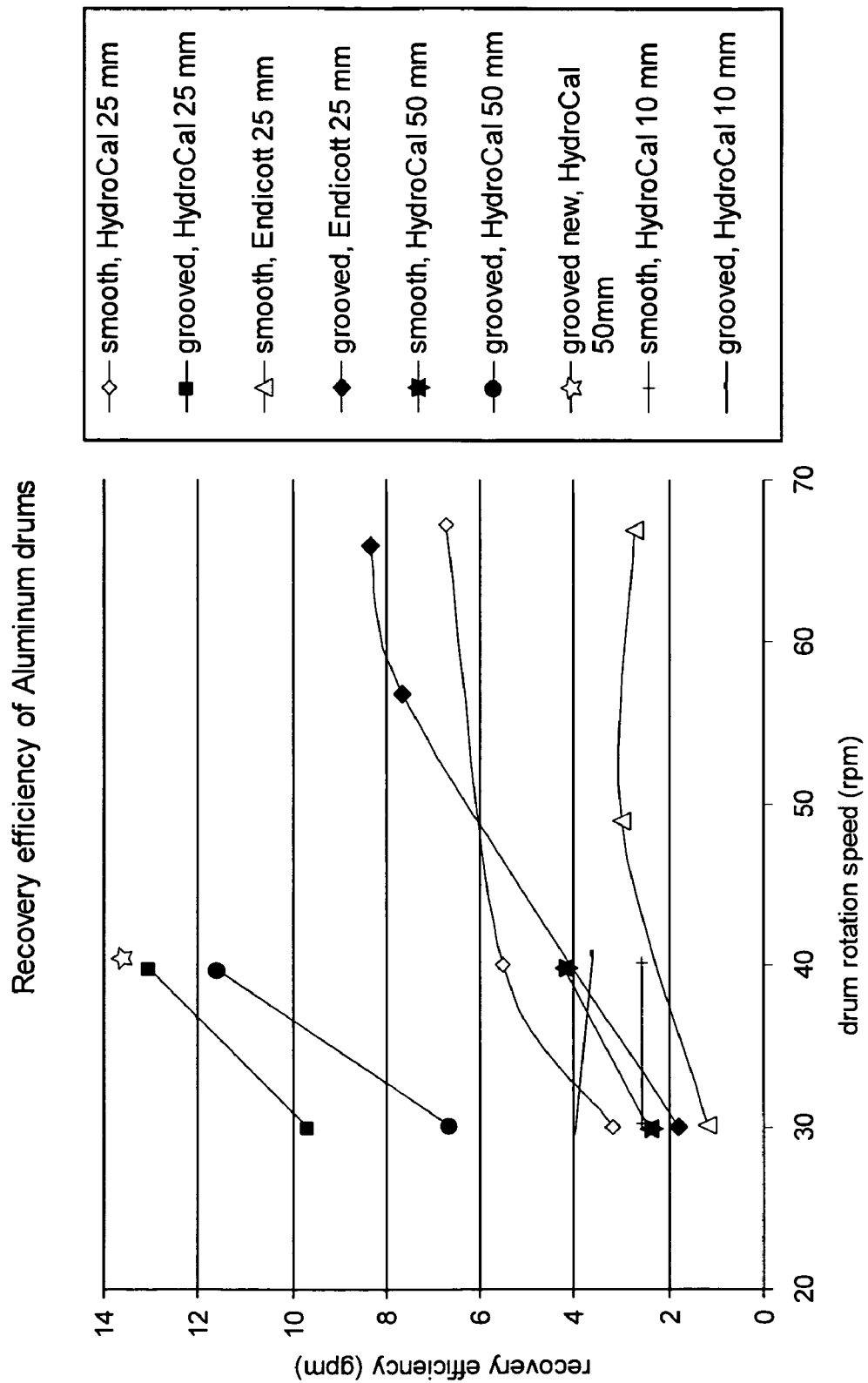
FIG. 37 is a graph showing the recovery efficiency of aluminum drums at 25-30° C.

A comparison of the effects of oil type, oil spill thickness and drum surface pattern on the recovery efficiency is summarized in FIG. 37. All presented data correspond to aluminum grooved and smooth drums. These data were collected during the first tests at the temperature between 25-30° C. The decrease in film thickness of HydroCal oil thickness from 25 mm to 10 mm led to a significant decrease in the recovery efficiency. This was especially pronounced in the case of grooved drums. An increase of oil thickness from 25 mm to 50 mm did not increase the recovery rates. Although FIG. 37 shows some decrease in the recovery efficiency at 50 mm, it was most likely caused by the fact that oil used for these tests was slightly emulsified and had an initial water content of about 6%. This reduced slightly the total oil recovered. When the grooved aluminum drum was tested with fresh HydroCal oil at 40 rpm and 50 mm, the result was similar to the recovery efficiency of the same drum at a 25 mm oil thickness. This data point is represented by the single star-shaped data point at the top of the graph.

FIG. 37 shows that the amount of oil recovered by the grooved drums was two (2) to three (3) times higher than the one recovered by the smooth drums. The oil type was also found to have a significant effect on the recovery efficiency, due mostly to the difference in viscosity.

Figure 38:
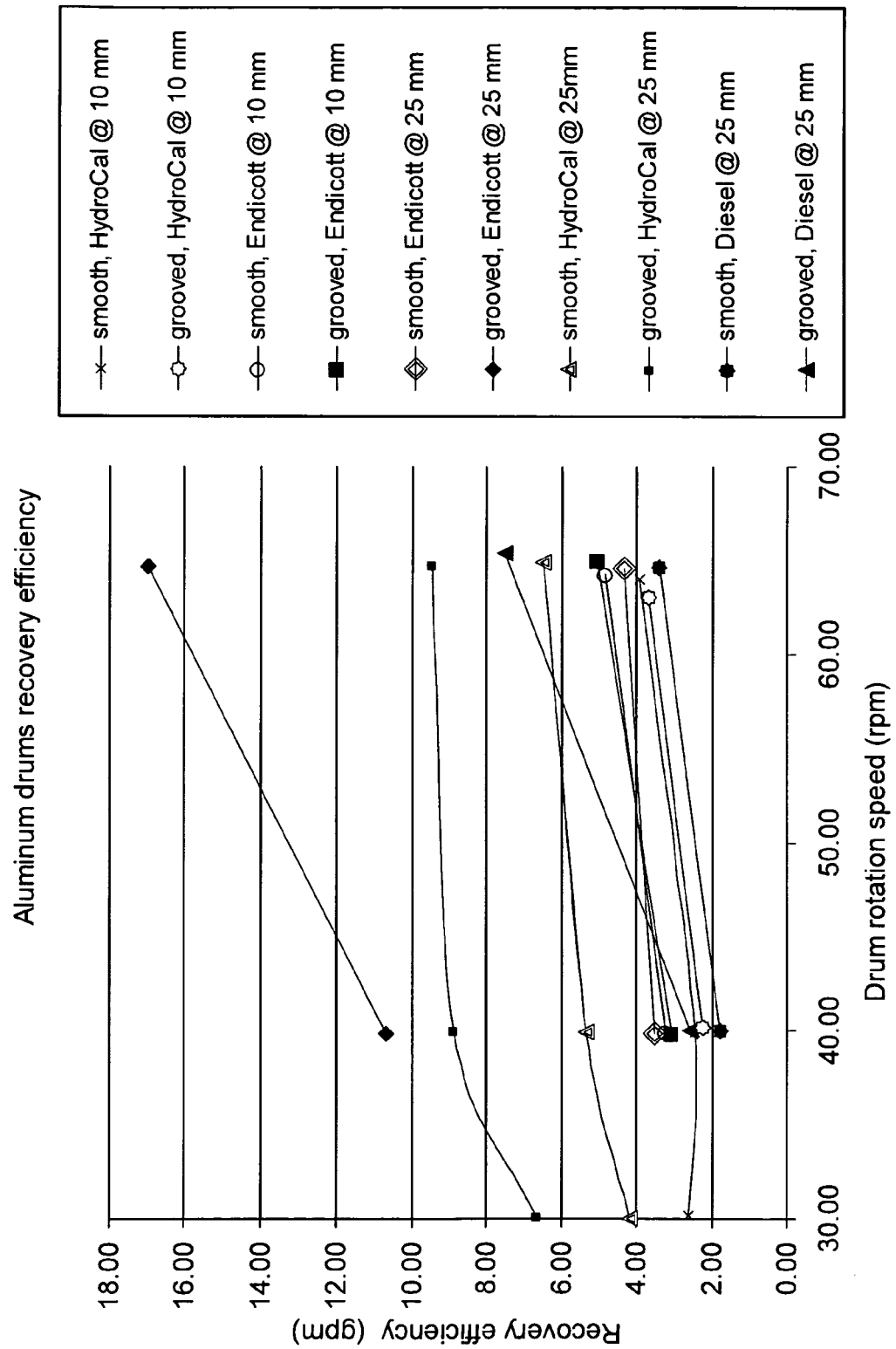
FIG. 38 is a graph showing the recovery efficiency of aluminum drums at 10-15° C.

The effects of the oil type, film thickness and drum surface pattern on the recovery efficiency observed during the second tests are summarized in FIG. 38. For an oil spill thickness of 10 mm, there was almost no difference between smooth and grooved drums. The surface pattern is much more effective for thicker oil slicks. At an oil thickness of 25 mm, the grooved pattern proved to be extremely efficient for Endicott oil and diesel, leading to two (2) to three (3) times higher recovery efficiency. Although the increase in recovery was less for the more viscous HydroCal oil, nevertheless the recovery efficiency increased by 50%. At 10 mm slick thickness, the recovery efficiency of HydroCal was lower than the one of Endicott. It might be explained by the increased viscosity of HydroCal at 10-15° C. At such small slick thickness water comes into contact with the drum and the total contact area between oil and the drum is reduced. More viscous HydroCal was not able to spread as fast as Endicott did and had lower access to the drum leading to a higher amount of recovered free water thereby reducing the overall recovery efficiency.

Figure 39:
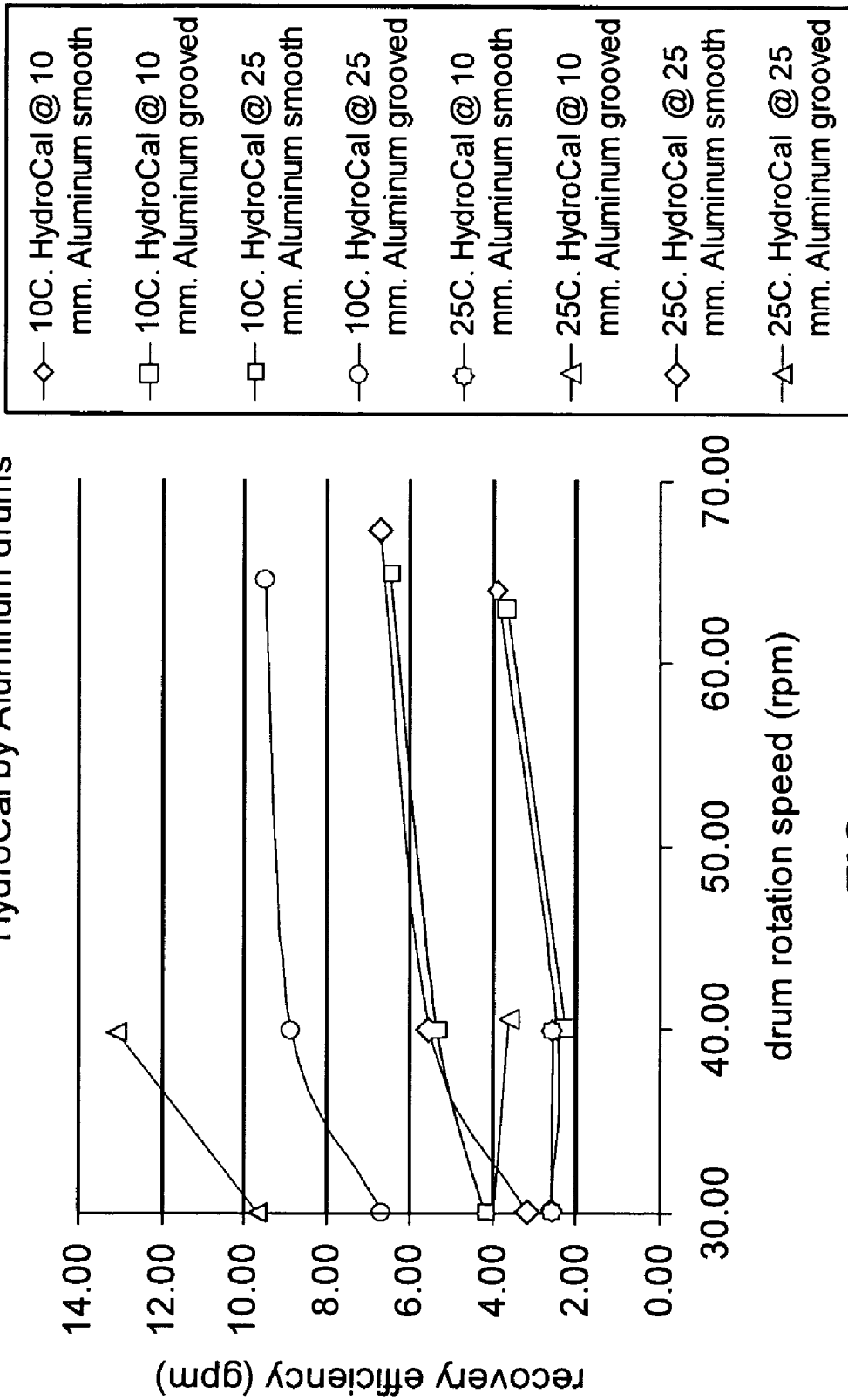
FIG. 39 is a graph showing the effect of temperature and film thickness on the recovery efficiency of HydroCal.

The effect of temperature and oil spill thickness on the recovery efficiency is illustrated in FIG. 39. At 10 mm oil thickness, temperature didn't have a significant effect on the recovery rates of smooth drums. During the second tests (at 10-15° C., which for simplicity is denoted as 10° C. on the graphic), grooved drums had recovery rates similar to smooth drums. The recovery rates of grooved drums during the Phase 1 tests (at 25-30° C., which for simplicity is denoted as 25° C. on the graphic), were significantly higher. Temperature change didn't have a significant effect on the recovery rates of smooth drums at 25 mm. At a 25 mm film thickness, grooved drums were considerably more efficient than the smooth drums, although their efficiency was higher at 25° C.

Figure 40:
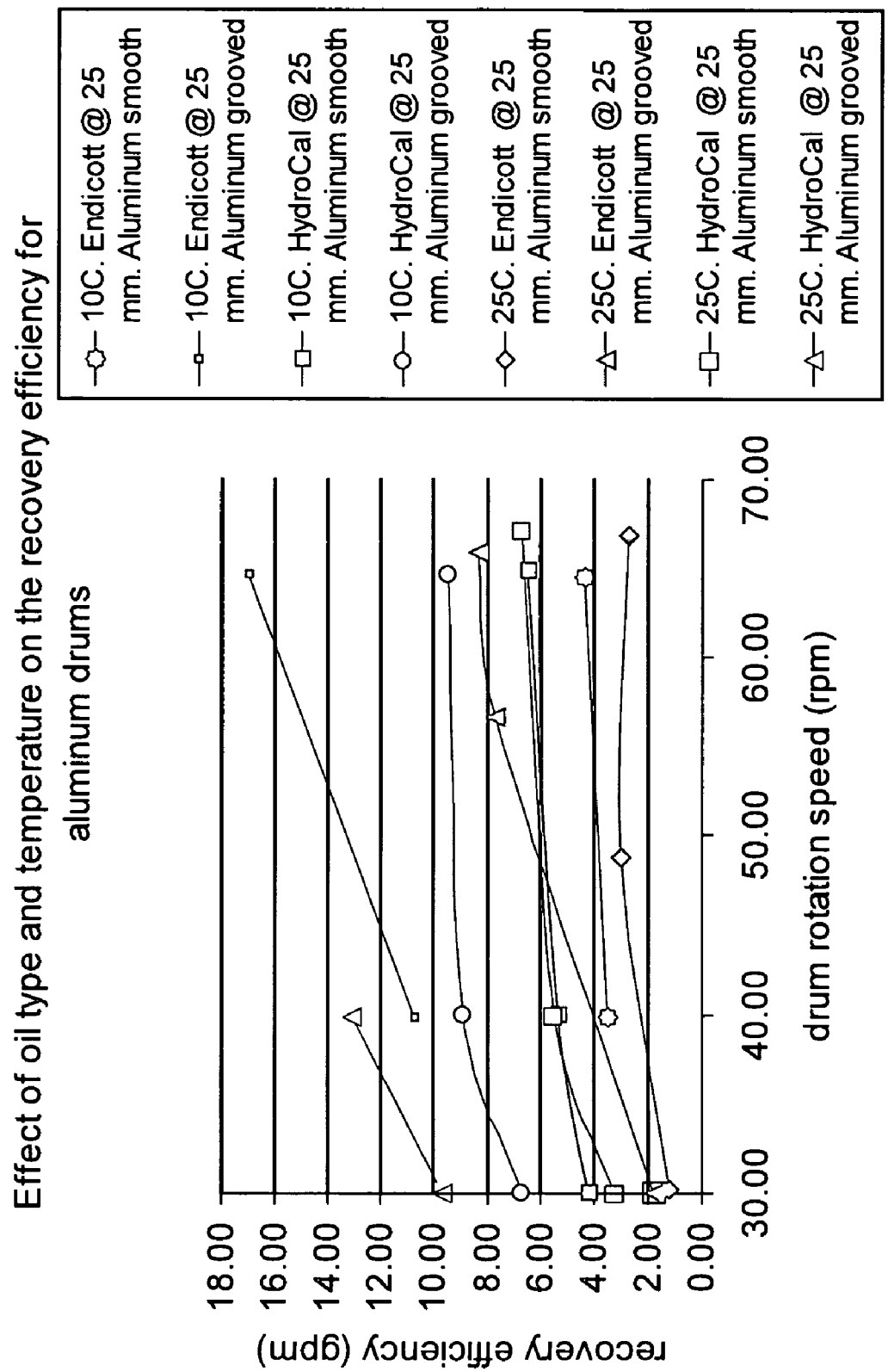
FIG. 40 is a graph showing the effect of temperature and oil type on the recovery efficiency of aluminum drums.

FIG. 40 shows the effect of oil type and temperature on the recovery efficiency of aluminum drums. The decrease of temperature led to a slight increase of Endicott recovery rates by smooth drums, wile it didn't have a major effect on the recovery rates of HydroCal. The decrease of temperature caused a test oils viscosity increase, which lead to a significant increase in the amount of recovered Endicott by grooved drums, while the recovery rates of HydroCal were somewhat reduced.

Through the foregoing experiments, it was found that:

(a) Use of a grooved pattern can increase the recovery efficiency by 100-200%. The grooved pattern was proven to be efficient even on Diesel, which is challenging to recover due to its low viscosity.

(b) The recovery efficiency of the grooved surface can be improved by tailoring groove dimensions to oil properties. Using more shallow and narrow groves for light diesel and fuel oil, and deeper and more open grooves for heavier oils may lead to even higher increase in the recovery efficiency.

(c) The selection of the recovery surface material can increase the recovery efficiency by 20%.

(d) The recovery efficiency significantly depends on the type of petroleum product and is typically proportional to its viscosity (when the oil is at temperature above its pour point).

(e) Oil spill thickness has a significant effect on the recovery efficiency. The increase in oil thickness from 10 mm to 25 mm led to higher recovery rates. The increase in oil thickness from 25 to 50 mm did not significantly increase the recovery rates. The amount of recovered free water was typically higher for 10 mm oil thickness than for the 25 or 50 mm oil thickness.

(f) Temperature decrease was found to increase the recovery rates by increasing the viscosity of oil and allowing for a thicker slick to remain on the recovery surface after withdrawal. HydroCal recovered using a grooved surface was the only exception. As the temperature decreased, the viscosity of HydroCal reached a point where oil would not penetrate deep enough into grooves leading to a smaller amount of recovered oil.

(g) Drum rotation speed had a significant effect on the recovery efficiency. For a skimmer and a drum type tested, 40 rpm appeared to be a nearly optimal rotation speed in most of cases. Beyond 40 rpm, the drum started to recover significant amounts of free water. Note, however, that free water was the only limiting factor. If a response team is not concerned with free water in the recovered product, the maximum rotation speed should be used to recover more oil.

It will be appreciated from the foregoing description, that the inventive grooved geometry is applicable to drum-type, disk-type, belt-type, or other types of skimmers or other devices that have a rotatable fluid recovery unit for contacting and collecting oil or other viscous fluids. In use, the fluid recovery unit is placed into a body of viscous fluid and rotated. This places the surface of the fluid recovery unit in contact with the body of viscous fluid. When the surface of the fluid recovery unit rotates out of (e.g., is withdrawn from) the body of viscous fluid, an amount of the viscous fluid adheres to the recovery surface. Once the recovery surface is withdrawn, it is scraped to remove the collected viscous fluid. The grooved geometry of the present invention helps to retain the viscous fluid, thereby separating the viscous fluid from water or another fluid. Accordingly, the present invention provides for both fluid separation and fluid recovery. Furthermore, the invention is applicable to removing petroleum from water, coconut oil from coconut juice, or any other viscous fluid that is floating on, mixed with, or otherwise carried by a host fluid from which the viscous fluid is to be separated and recovered.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

The Effect Of A Groove Angle On The Surface Area

| Angle of surface grooves | Surface area (mm$^2$) - grooved side |
| --- | --- |
| 180° - flat surface | 1453 |
| 90° grooves | 2005 |
| 60° grooves | 2896 |
| 30° grooves | 4663 |

TABLE 2

Properties Of Oils Used In Ohmsett Field Tests

|  | Density at 15° C. (g/ml) | Viscosity at 15° C. (cP) | Asphaltenes % |
| --- | --- | --- | --- |
| Diesel | 0.833 | 6 | 0 |
| Endicott | 0.915 | 84 | 4 |
| HydroCal 300 | 0.906 | 340 | 0 |

What is claimed is:

1. An apparatus for recovery of a viscous fluid, comprising:
a rotatable fluid recovery unit having a radial axis;
said rotatable fluid recovery unit having a surface patterned with a plurality of small scale grooves which have confined spaces;
said grooves having openings, interiors, and inner termini:
said grooves configured for collecting and retaining a viscous fluid which contacts said surface;
said grooves patterned on a sufficiently small scale to draw and retain said viscous fluid by capillary effect in the confined space of each of said grooves for retaining the viscous fluid in menisci pooled at the inner terminus of each of said grooves;
each of said grooves having a sufficient opening to allow said viscous fluid to enter, and having groove dimensions tailored to the viscosity of the viscous fluid to be recovered toward maximizing recovery; and
said grooves oriented with the radial axis of said fluid recovery unit and configured for receiving a scraper through the opening of said grooves to scrape out viscous fluid from the interior of said grooves during recovery of the viscous fluid.

2. An apparatus as recited in claim 1, wherein said grooves of said fluid recovery unit are configured to form a menisci of retained viscous fluid in said grooves such that said viscous fluid pools in said grooves.

3. An apparatus as recited in claim 1, wherein said fluid recovery unit comprises a drum-type, belt-type, or disk-type fluid recovery unit.

4. An apparatus as recited in claim 1:
wherein each of said grooves has a pair of spaced apart walls;
wherein each of said grooves has an inner terminus bordered by said spaced apart walls;
wherein said spaced apart walls have a spacing and angle such that when said surface is placed in contact with a viscous fluid, capillary action operates to form menisci as said viscous fluid pools in said grooves.

5. An apparatus as recited in claim 1, wherein said grooves have a depth of approximately one inch or less.

6. An apparatus as recited in claim 1:
wherein said grooves are defined by walls having an angle of separation; and
wherein said angle of separation is approximately sixty degrees or less.

7. An apparatus as recited in claim 1:
wherein said grooves are defined by walls having an angle of separation; and
wherein said angle of separation is approximately thirty degrees or less.

8. An apparatus as recited in claim 1:
wherein said grooves are defined by an angle of separation at the opening of each groove and with an angle apex at the interior terminus of the groove; and
wherein said angle of separation slows draining of viscous fluid from said grooves.

9. An apparatus as recited in claim 1:
wherein said fluid recovery unit has first and second ends;
wherein said fluid recovery unit has a central longitudinal axis extending between said first and second ends;
wherein said fluid recovery unit as a central radial axis that is orthogonal to said longitudinal axis;
wherein said grooves are substantially aligned with said central radial axis.

10. An apparatus as recited in claim 1, further comprising:
a scraper;
said scraper having an edge geometry complementary to said grooves.

11. In a fluid recovery apparatus having a rotatable fluid recovery unit having a radial axis and a collection surface for recovering a viscous fluid, the improvement comprising:
patterning the collection surface of said fluid recovery unit with a plurality of small scale grooves which have confined spaces;
said grooves are oriented with the radial axis of said fluid recovery unit and configured with a narrow opening for collecting and retaining a viscous fluid which contacts said surface;
said small scale grooves having a depth of approximately one inch or less, and said grooves having an angle of separation of approximately sixty degrees or less, so that said grooves are patterned on a sufficiently small scale to create a capillary effect in the confined space of each of said grooves for retaining the viscous fluid in menisci pooled at the inner terminus of each of said grooves.

12. An improvement as recited in claim 11, wherein said grooves of said fluid recovery unit are configured to form menisci of retained viscous fluid in said grooves such that said viscous fluid pools in said grooves.

13. An improvement as recited in claim 11, wherein said fluid recovery unit comprises a drum-type, belt-type, or disk-type fluid recovery unit.

14. An improvement as recited in claim 11:
wherein each of said grooves is bounded by spaced apart walls;
wherein each of said grooves has an inner terminus bordered by said spaced apart walls;
wherein said spaced apart walls have a spacing and angle of separation bounded with apex at the depth of each of said grooves and extending across said opening whereby when said surface is placed in contact with a viscous fluid, menisci are formed and said viscous fluid pools in said grooves.

15. An improvement as recited in claim 11, wherein said angle of separation is approximately thirty degrees or less.

16. An improvement as recited in claim 11, wherein said narrow angle of separation slows draining of viscous fluid from said grooves.

17. An improvement as recited in claim 11:
wherein said fluid recovery unit has first and second ends;

wherein said fluid recovery unit has a central longitudinal axis extending between said first and second ends;

wherein said fluid recovery unit has a central radial axis that is orthogonal to said longitudinal axis; and wherein said grooves are substantially aligned with said central radial axis.

18. An improvement as recited in claim 11, further comprising:

a scraper;

said scraper having an edge geometry complementary to said grooves.

19. A method for recovering a viscous fluid, comprising:

patterning a fluid collection surface of a fluid recovery unit with a plurality of small scale grooves oriented to a radial axis of said fluid recovery unit;

said grooves of a small scale having narrow openings configured for collecting and retaining a viscous fluid which contacts said surface;

said grooves patterned on a sufficiently small scale to create a capillary effect in a confined space of each of said grooves for retaining the viscous fluid in menisci pooled at an inner terminus of each of said grooves;

each of said grooves having a narrow opening sufficient for allowing said viscous fluid to enter and having groove dimensions tailored to properties of the viscous fluid to be recovered toward increasing recovery rate;

placing the surface of said fluid recovery unit in contact with a body of viscous fluid;

moving the surface of said fluid recovery unit in relation to a body of viscous fluid to collect said viscous fluid within said grooves on said fluid recovery unit; and collecting said viscous fluid from the narrow openings in said grooves in the surface of said fluid recovery unit.

20. A method as recited in claim 19, wherein said fluid recovery unit comprises a drum-type, belt-type, or disk-type fluid recovery unit.

21. A method as recited in claim 19:

wherein each of said grooves is bounded by a pair of spaced apart walls between which is defined an angle of separation to an apex at the depth of the groove;

wherein each of said grooves has an inner terminus bordered by said spaced apart walls;

wherein said spaced apart walls have a spacing and angle such that when said surface is placed in contact with a viscous fluid, menisci are formed and said viscous fluid pools in said grooves.

22. A method as recited in claim 21, wherein said angle of separation is approximately sixty degrees or less.

23. A method as recited in claim 21, wherein said angle of separation is approximately thirty degrees or less.

24. A method as recited in claim 21, wherein said angle of separation slows draining of viscous fluid from said grooves.

25. A method as recited in claim 19, wherein said grooves have a depth of approximately one inch or less.

26. A method as recited in claim 19:

wherein said fluid recovery unit has first and second ends;

wherein said fluid recovery unit has a central longitudinal axis extending between said first and second ends;

wherein said fluid recovery unit as a central radial axis that is orthogonal to said longitudinal axis; and wherein said grooves are substantially aligned with said central radial axis.

27. A method as recited in claim 19, further comprising:

scraping said viscous fluid from within said grooves of said fluid recovery unit in collecting the viscous fluid;

wherein said scraping is performed with a scraper having an edge geometry complementary to said grooves of said fluid recovery unit.

* * * * *